Figure 2B:
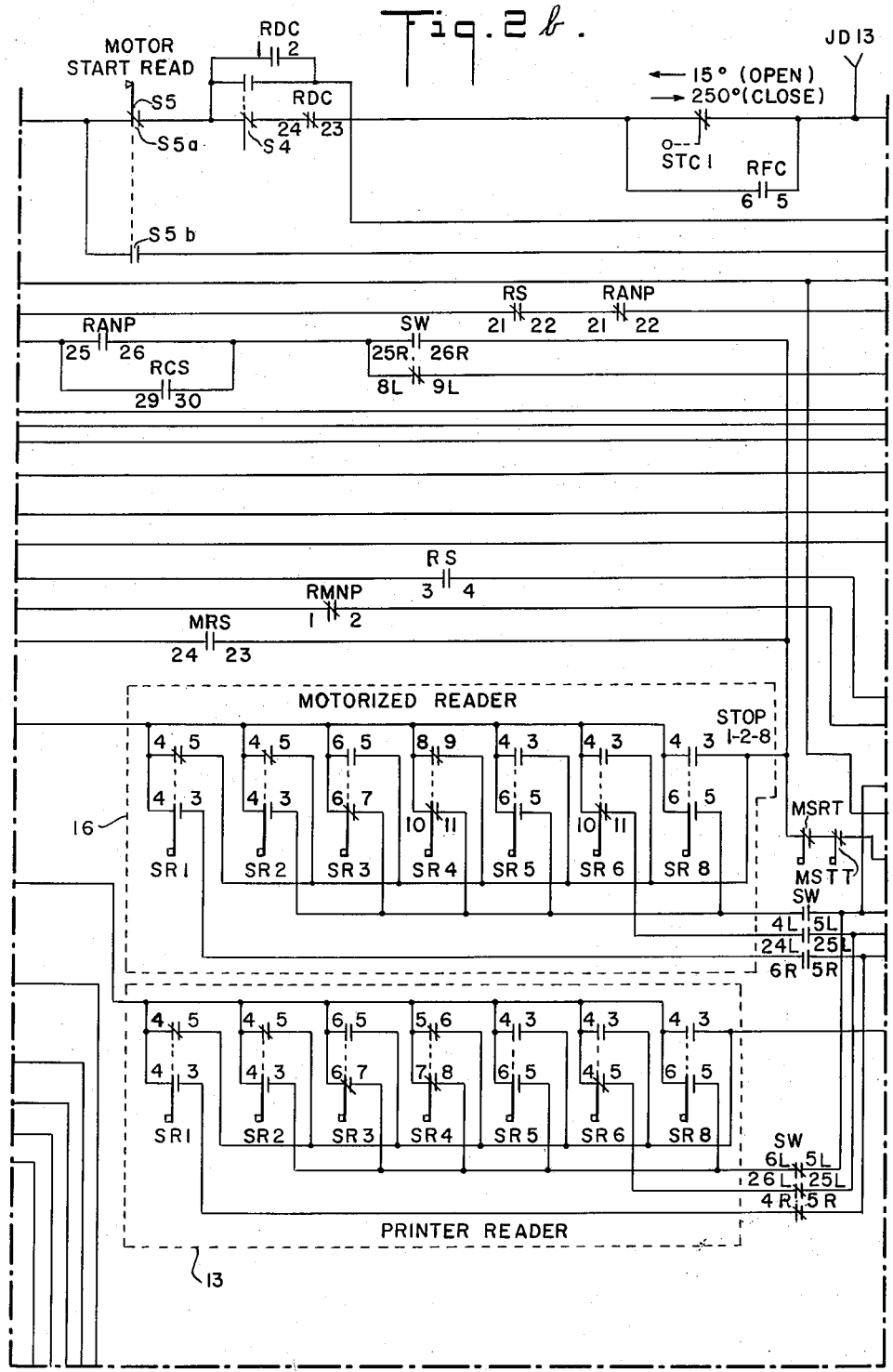
Figure 2E:
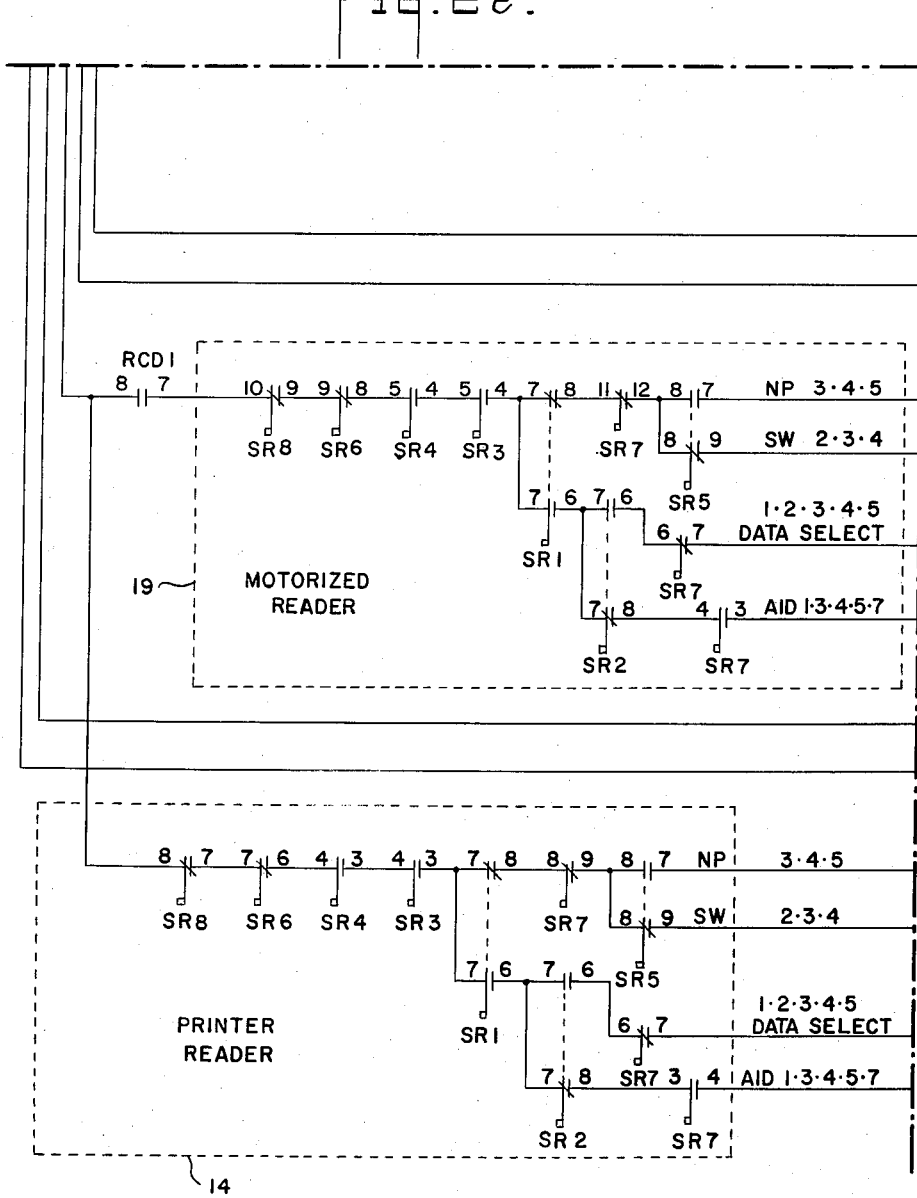
Figure 2F:
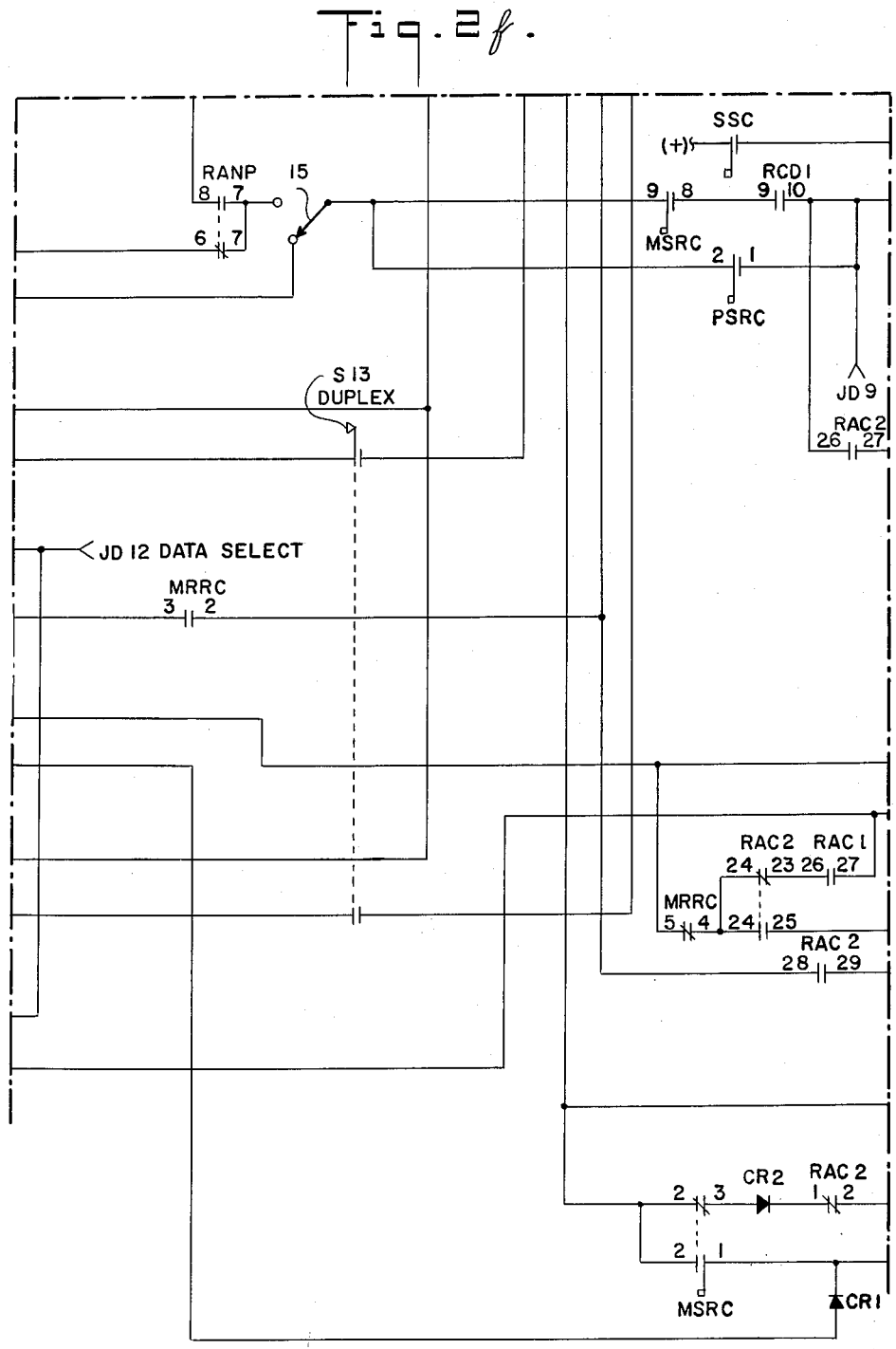

March 20, 1962     E. O. BLODGETT ET AL     3,025,941
SELECTIVE DATA TRANSLATING SYSTEM
Filed March 27, 1959                        16 Sheets-Sheet 1

Fig. 1.

START READ (S1)     (TABULATE)              October 27, 1958
AID-12
DATA SELECT
CODE 12345,0        Mr. John A. Jones
SW                  377 High Street
SW                  New York, New York
SW                  Dear Mr. Jones:
SW
AID-1               This is a demonstration of a data translation system as applied to letter writing. It may SW                  also be used to acknowledge orders or for
SW
AID-5               the preparation of invoices.
SW
SW
                    The date was printed automatically. The inside name and address was automatically punched into AID-125             another tape for later use.

In preparing letters and other documents, various

SW                  amounts ($100.00) of money may be selected at
SW
                    high speed. Any variable information can be
DATA SELECT
CODE 12345,-        selected either manually (123456) or automatically
AID-6
SW                  (abcdefg) through pre-programmed tapes, or variable
SW
AID-32              information may be collated (ties) (ties) (ties)
SW
AID                 (shirts) (shirts) for use as desired.
AID
STOP
MANUAL AID-33
CARRIAGE RETURN                             Very truly yours,
START READ (S5)
AID
SW The Smith Company

*INVENTORS*
                                        EDWIN O. BLODGETT
                                          GILBERT A. DENIS
                                    BY  John A. Harvey
                                                *ATTORNEY*

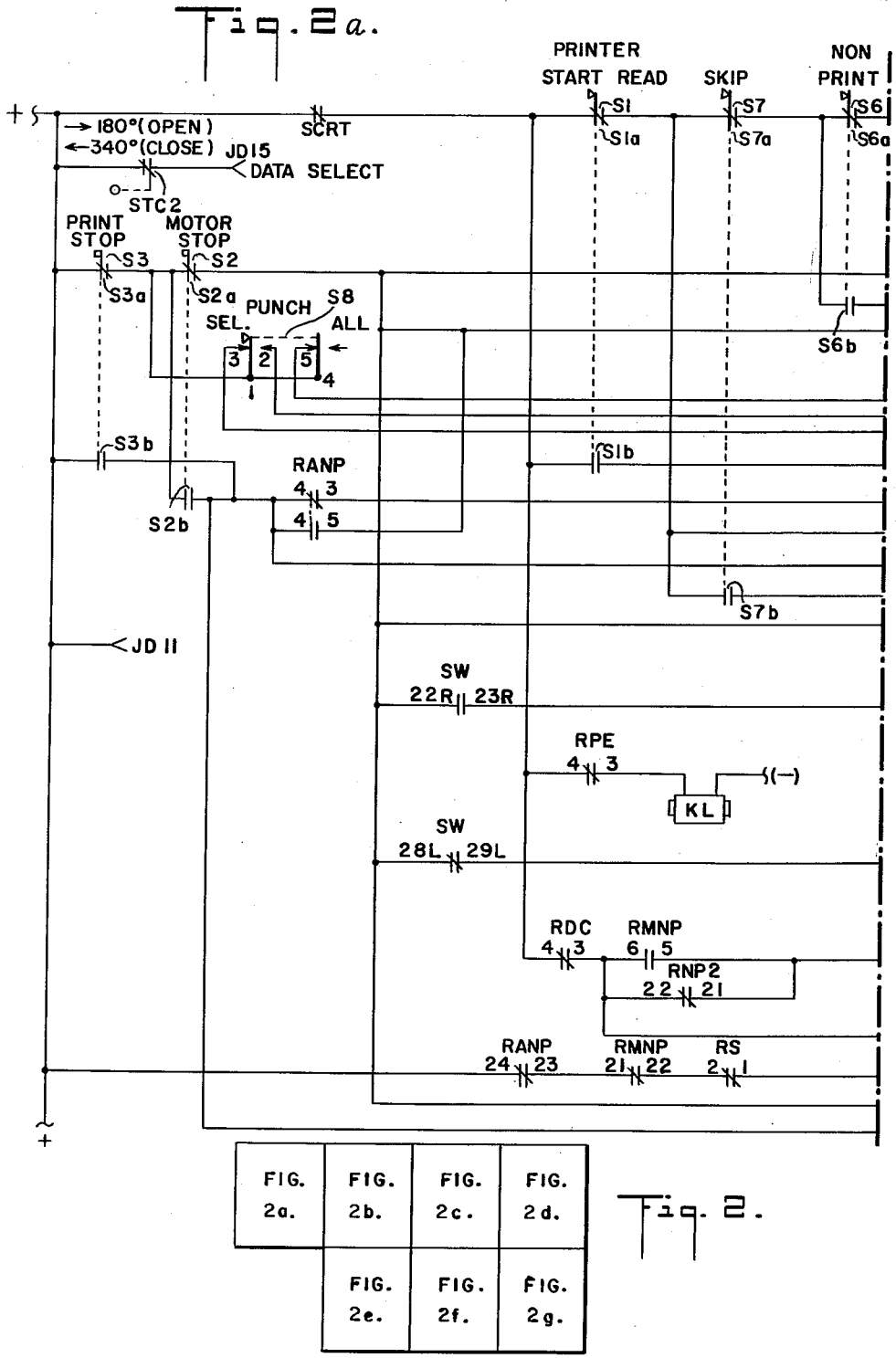

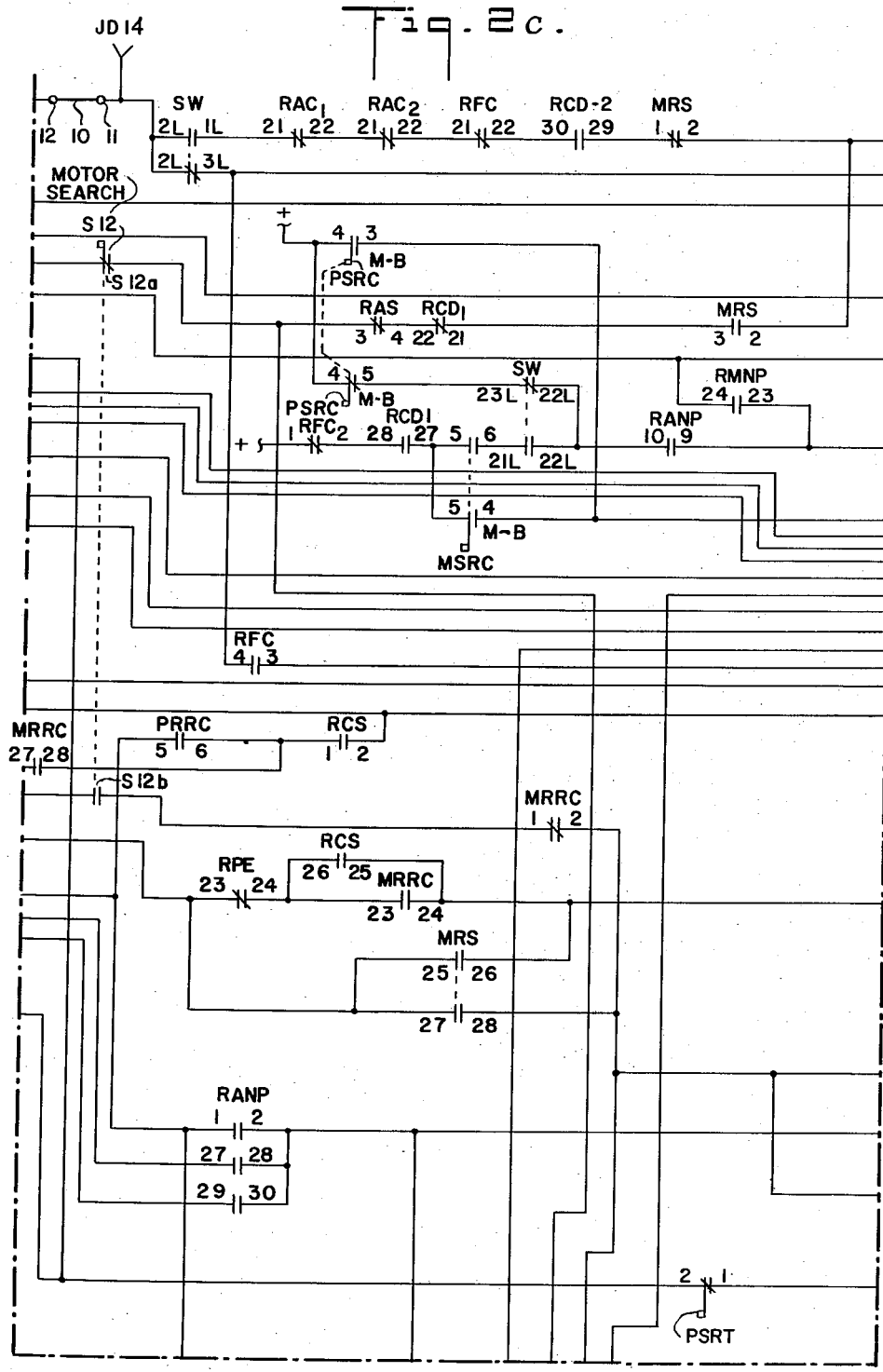

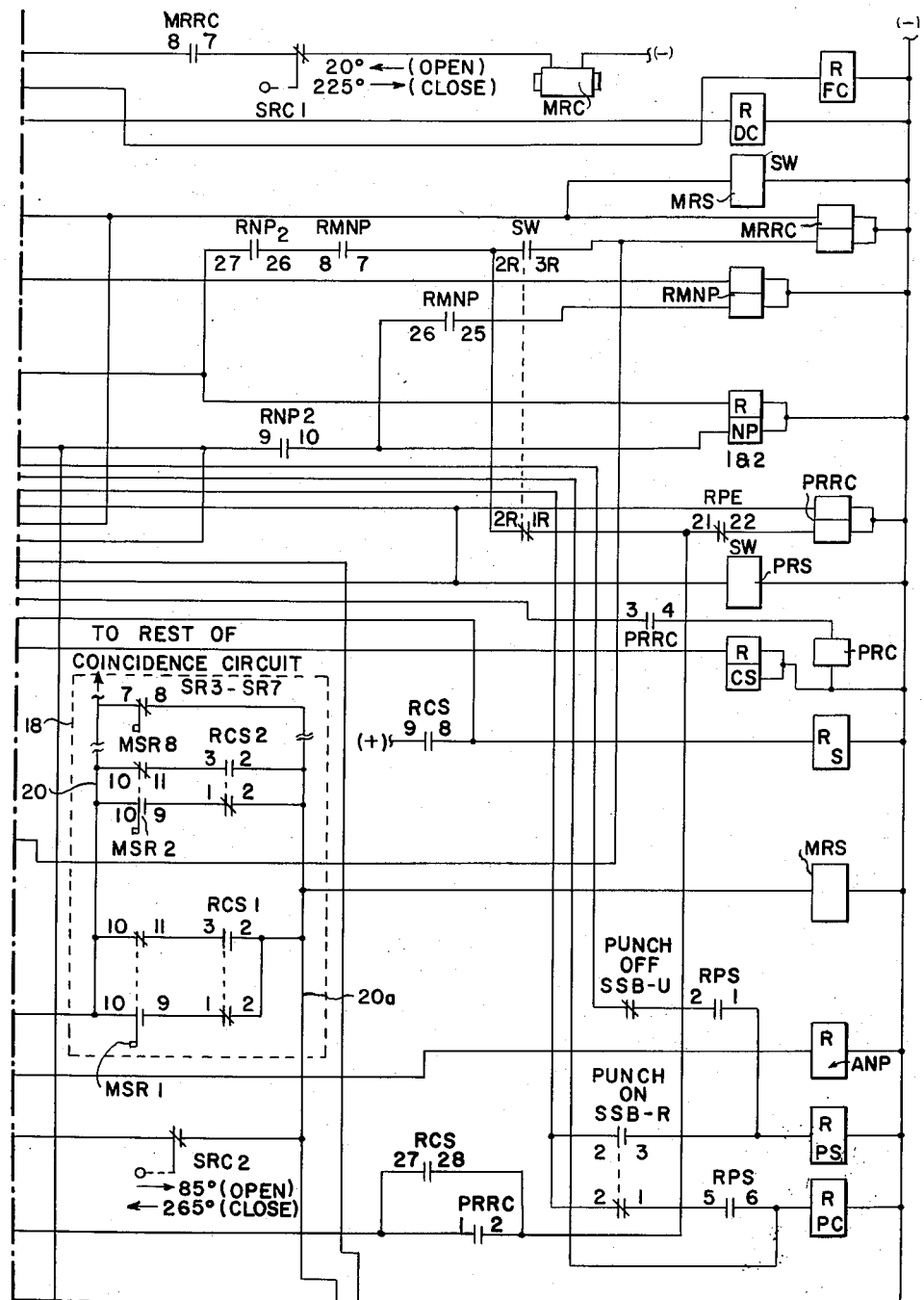

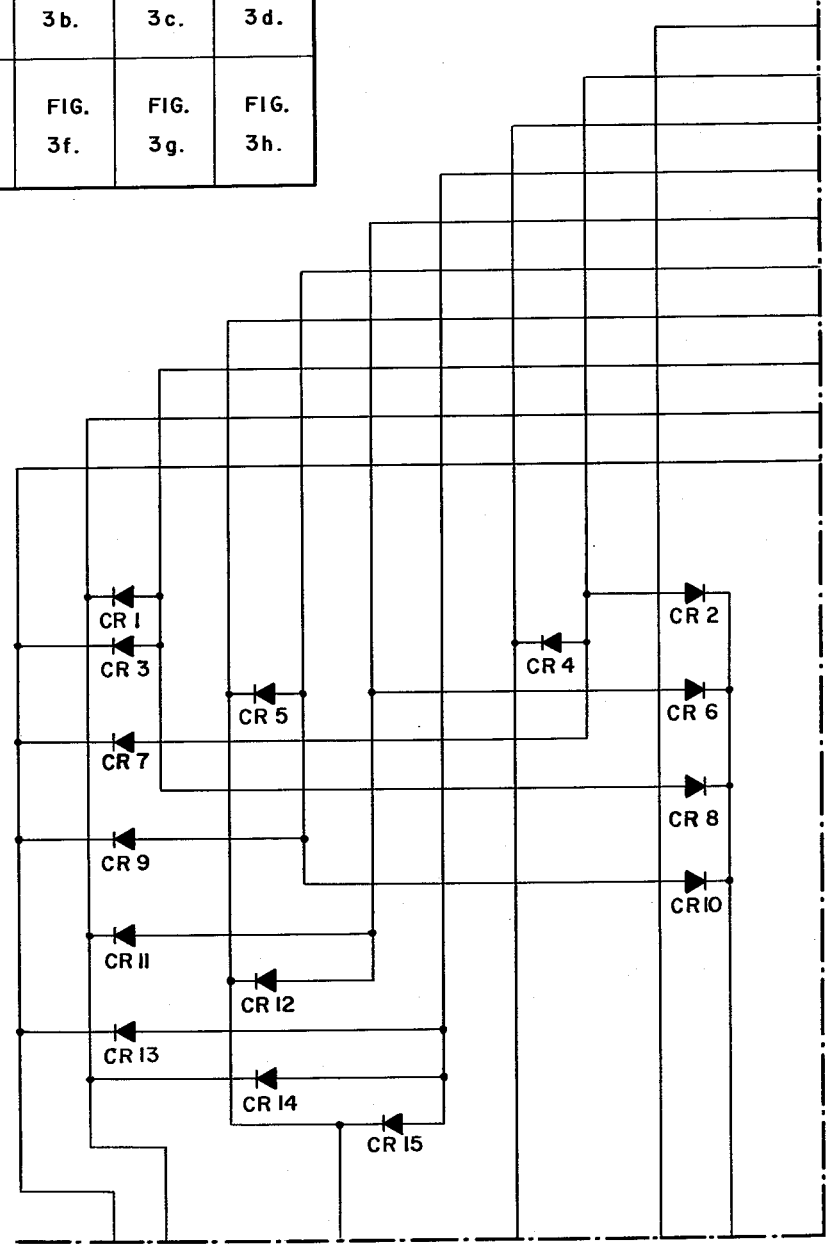

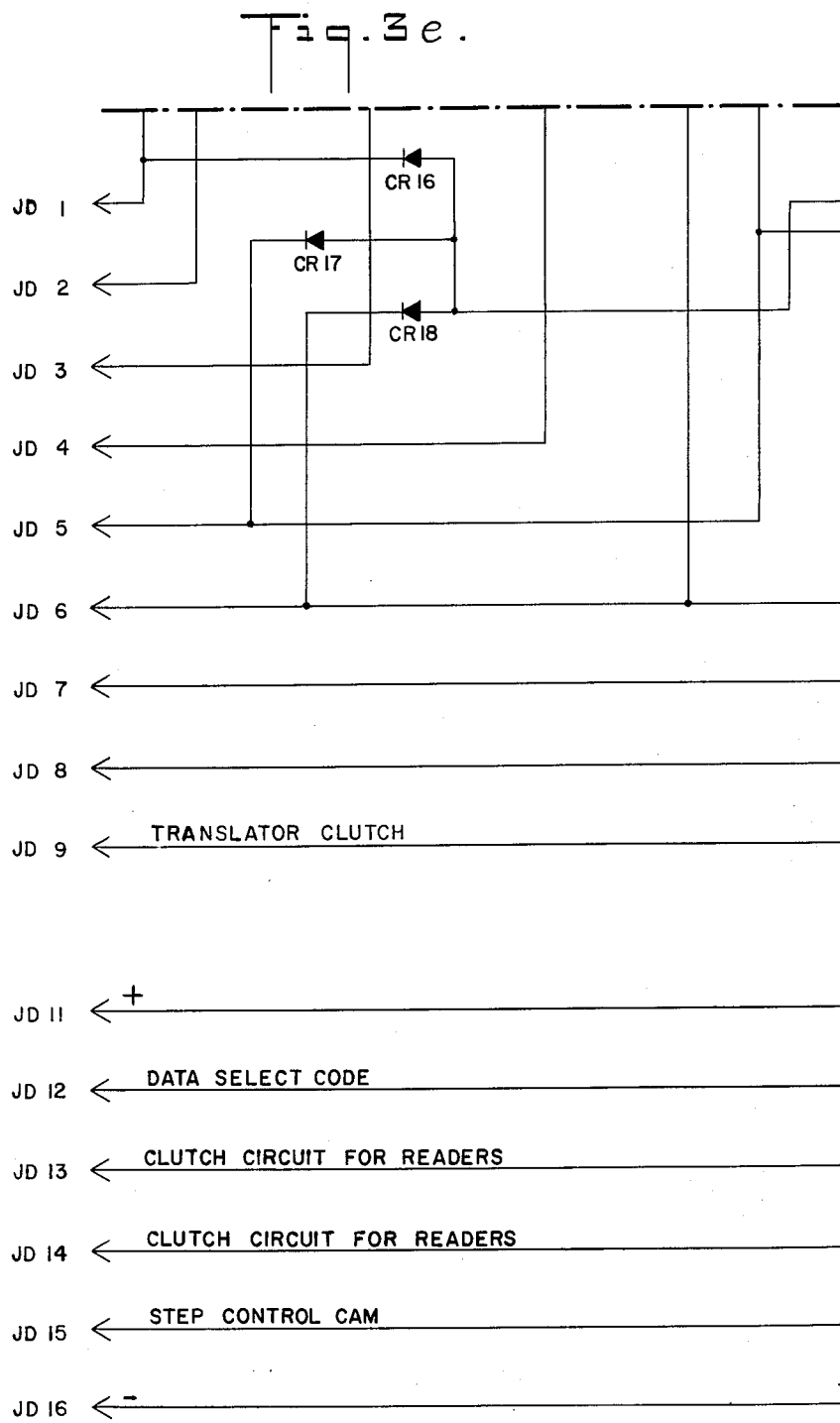

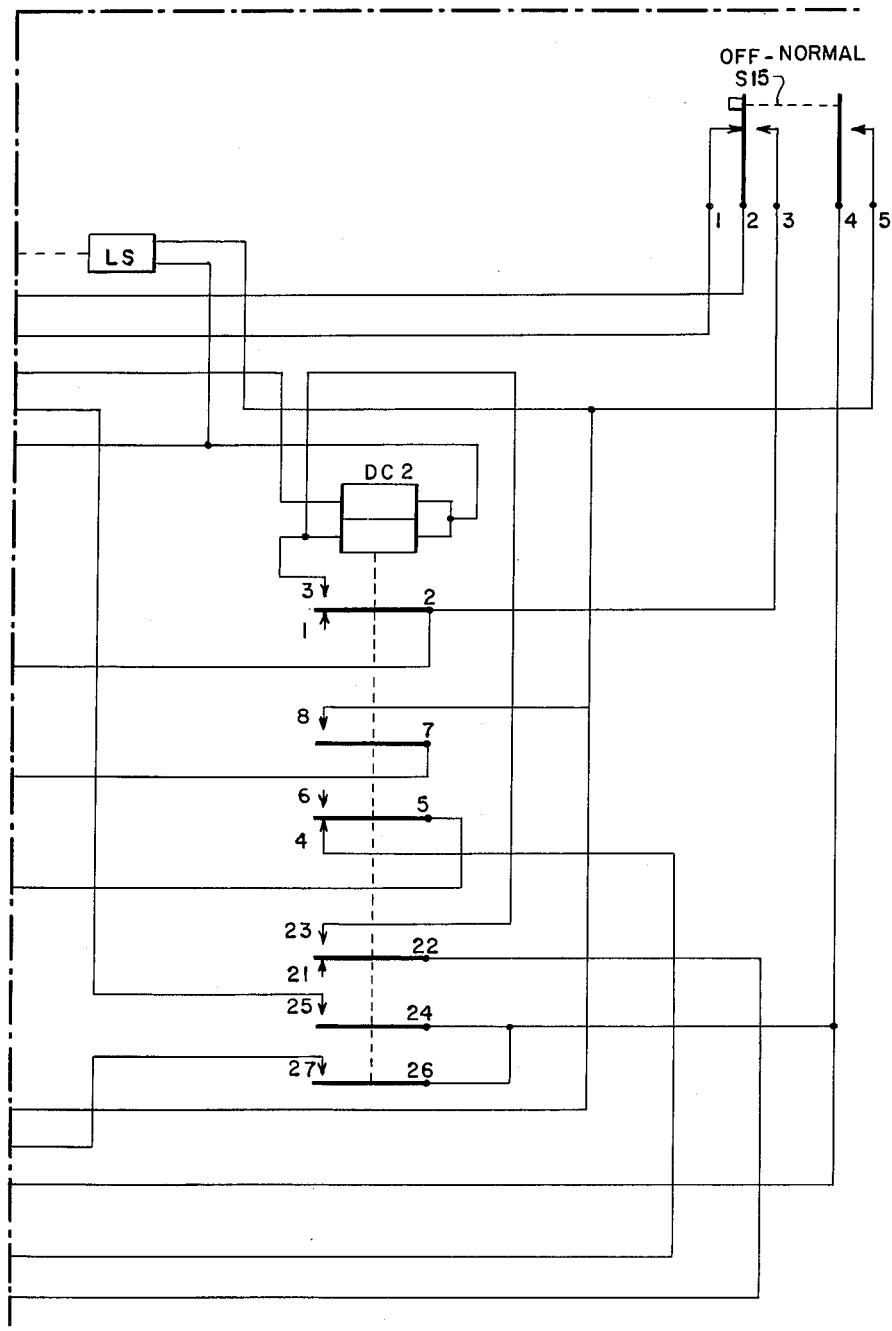

United States Patent Office 3,025,941
Patented Mar. 20, 1962

3,025,941
SELECTIVE DATA TRANSLATING SYSTEM
Edwin O. Blodgett and Gilbert A. Denis, Rochester, N.Y., assignors to Commercial Controls Corporation, Rochester, N.Y., a corporation of Delaware
Filed Mar. 27, 1959, Ser. No. 802,331
40 Claims. (Cl. 197—20)

The present invention relates to data translation systems and, particularly, to systems in which data to be processed may be selectively derived from a record medium and selectively supplied to data translation devices for utilization. While the invention has wide utility, it has particular utility in connection with data printers utilizing punched-tape record media and will be described in that connection.

Punched-tape has been widely accepted in integrated data processing systems for automatic operation of document and data originating machines. A tape-controlled printing machine of this nature is the subject of U.S. Patent No. 2,700,446, granted January 25, 1955 to E. O. Blodgett, and an improved tape-controlled printing machine is disclosed in the Edwin O. Blodgett et al. U.S. Patent No. 2,905,298, granted September 22, 1959. The printing machine disclosed in the patent last mentioned utilizes automatic program control to facilitate the preparation of documents and accompanying by-product punched-tape record media for use in further integrated data processing.

Tape-controlled printing machines of the type last mentioned provide very high speed and extreme accuracy in reproducing documents and in eliminating repetitive manual keyboarding operations. They permit much repetitive or invariable data to be automatically reproduced in the preparation of successive documents of like or similar format while at the same time enabling manual printing operations for the insertion of variable data required in the preparation of each individual document. It has heretofore been proposed that invariable data be supplied from one record medium and a limited amount of selectable variable data, such as names and addresses, be supplied item-by-item in succession from a second record medium in the preparation of such documents as form letters and the like. However, it is often desirable even in such simple applications as form letter preparation that a wide range of variable data be supplied as and when required and without regard to the order of recording of successive data items in the second record medium, and that the selection of such variable data be subject to automatically controlled program selection thus to enable a high degree of flexibility in document preparation.

This may conveniently be illustrated by way of example. Suppose that a form letter is to be directed to several categories of merchants of different functional category, or to merchants of different size within any given category. The form letter will be comprised in large part of invariable information applicable to all addresses to whom it is directed, but it is often desirable both to use a personal salutation and to make such necessary changes to the text of each individual letter as to render it appropriate to the particular category and category sub-division in which the addressee falls. Thus quoted quantities and prices and the terms and conditions of sale of a product may well differ between several functional categories of merchants and may also differ between merchants of different size within the same category. While individual form letters to each category and category sub-division of merchant could be prepared and reproduced, this would necessitate not only the preparation of numerous differing form-letters texts but also the careful pre-collection into appropriate groups of all those to whom a particular text is to be directed. It would be more desirable that all of this be accomplished in an automatic manner controlled only by a record identifying the individual addressee concerned and without regard to any particular collating of addresses into categories and category sub-divisions.

A data processing system capable of accomplishing the desirable results last mentioned would have much more widespread utility in business applications than the mere preparation of the form letter discussed. The record tape which enabled the preparation of a form letter relating to solicitation of orders for specified products would then be available for invoicing the products sold as a result of the solicitation. In preparing the invoice forms, much of the variable data required is found in the record tape. In particular, there is recorded with the name of the addressee his functional category and category sub-division in the merchandising field, the offered quantities and prices, and the terms and conditions of sale of the solicitation as applicable to him. Thus it would be desirable that all of this information be again used by automatic information selection in accomplishing the acknowledgement of orders received and the invoicing of goods sold. It would further be desirable for inventory control purposes that a by-product tape be produced during preparation of order acknowledgements or preparation of invoices, or both, in order that the by-product tape may later be used to make a record by individual product of the total number of each item ordered and the total number of each item shipped. For sales and management purposes, it would further be desirable that this by-product tape be available for use in summarizing the total dollar sales for each item invoiced during selected periods, and that invoice totals be selectable at will from the by-product tape for purposes of recording total sales within a given period of time.

It is an object of the present invention to provide a new and improved data translation system capable of accomplishing the desirable results heretofore enumerated.

It is a further object of the invention to provide a data translation system wherein plural data storage record media may be utilized to supply under program control the data stored in either medium selectively to data translating devices for utilization, the selection of the record medium to be used for this purpose at any time being effected either under manual control or in response to prerecorded program control stored in interspersed relation with the data information of either record medium.

It is an additional object of the invention to provide a data translation system wherein a record medium storing plural categories of data with category identifying addresses may be searched at a high reading rate to locate a particularly category of data, with the selection of category made either manually or by means of other recorded selection control as desired, after which any data of the selected category when located in the record medium is read at a lower reading rate to control the operations of data translating devices which may under selective control either print the data or re-record it in whole or in part or both print and record the data in whole or in part.

It is yet a further object of the invention to provide a data translation system wherein a record medium storing plural categories of data with category identifying addresses may be searched at high reading rate to locate and supply to data utilization devices at much lower reading rate each successive information item or successive block of information having a selected category address while skipping over all other recorded information of the medium, thus collating all data of the category selected; and one wherein selection of the data category may be made either manually or automatically as desired and may be readily changed by manual or program control at any time.

It is a further object of the invention to provide a data translation system wherein plural data storing media readers are so inter-controlled that each initiates a record medium reading operation at command of the other, in which one reader on command of the second repeatedly searches its record medium for particular data having an identifying address specified by the medium read at the second reader, and in which the one reader upon locating the addressed data halts and awaits a further read command from the second reader or immediately proceeds to supply the addressed data at slower reading rate if such reading command had previously been given prior to locating the addressed data.

Other objects and advantages of the invention will appear as the detailed description thereof proceeds in the light of the drawings forming a part of this application and in which:

FIG. 1 illustrates by way of example a typical form letter prepared by use of the data translation system of the present invention;

FIGS. 2a–2g, arranged as indicated in FIG. 2, represent the electrical control system of a data translation system embodying the invention; and FIGS. 3a–3h, arranged as indicated in FIG. 3, show the electrical circuit arrangement of a manual data insertion unit which may be used with the data translation system of FIG. 2.

GENERAL ORGANIZATION AND OPERATION

The data translation system herein described utilizes a punched-tape controlled printer of the type shown in the aforementioned Blodgett or Blodgett et al. patents, to which reference is made for an understanding of the general mechanical construction and operation of the printer and its associated punched-tape reader and by-product tape punch. As there explained, data and functional control information is recorded by combinational arrangements of code bits positioned in successive groups each identifying an alpha-numeric character, a symbol, or a function to be performed. In the arrangement herein described, this punched-tape uses a maximum of 8 code bits and thus is said to convey 8 channels of information. The punched-tape reader used to read the recorded information has a tape feed arrangement for moving the tape code bit group by code bit group through the reader and each code group is read by aligned reading pins of which there is one pin for each code level used. Those reading pins which project through apertures of the tape during a reading operation complete electrical circuits which may be used either to actuate a code translator structure in the printer, and thereby effect power driven key lever and functional control actuations of the printer, or to energize punch magnets of a punch structure to effect repunching of the information into a by-product tape. Key lever and functional control operations of the printer also energize coded combinations of electircal output circuits which may control the punch to record in the by-product tape selected portions or all of the information necessary to duplicate the printed copy and its format. As further pointed out in the aforementioned Blodgett et al. patent, an additional punch unit may be provided and coded information may at any time be supplied to both of these punch units or to only a selected one of them so that the by-product tapes which they produce may contain all or only specific information items, and this may be accomplished under program control information recorded in the tape passing through a tape reader.

The data translation system herein described includes a second tape reader which may be included in a self-motorized unit cable connected to the printer structure and having the general construction of that disclosed in the E. O. Blodgett et al. U.S. Patent No. 2,927,158, granted March 1, 1960, entitled Code Form Converter, and assigned to the same assignee as the present application. The arrangement herein described may also include, constructed integrally with the printer or reader last mentioned or even as a separate auxiliary unit, a manual data selector by which numeric information up to a maximum of ten digits and one or more symbols may be manually selected for programmed use in a manner hereinafter described. Either tape reader has the ability under manual or programmed control to skip over recorded information until the skipping is terminated under program control or manually. The system also has the ability to effect non-printing of information read from either tape. This latter operation is subject to initiation either manually or under program control; it is terminated manually if manually initiated, or otherwise may be manually halted (but not manually terminated) and is eventually terminated only by a programmed print restore code read from a tape. The information read but not printed during a non-print operation may be recorded, under selective program control, in one or both of the by-product tapes previously mentioned so that any information read by either of the two tape readers but neither printed may be recorded in whole or in part in either one or both of the by-product tapes by selective control of the by-product tape punches.

For convenience of description, the punched-tape reader which forms a component of the printer as in the aforementioned Blodgett et al. Patent No. 2,905,298 will be hereinafter referred to as the printer tape reader whereas the second punched-tape reader will be referred to for convenience as the motorized reader. It will be understood that this designation is used simply for convenience of description, and does not imply that the scond tape reader is necessarily a separate and distinct motorized unit as distinguished from a construction wherein it also is a component of the printer.

The punched-tape used in the system herein described utilizes an 8-level punch code which may be similar to that used in the aforementioned Blodgett et al. Patent No. 2,905,298 in so far as normal alpha-numeric characters, symbols, and functional control information is concerned. The eighth level of the code is particularly used, however, to identify any of 127 different address or classification codes used at the beginning of each item or block of information which is to form the subject of an information search peformed by the motorized reader during operation of the system. The address codes thus differ from normal information codes by always including a code bit in the 8th channel. Each item, or block of information, thus identified by an address is terminated by an address identification code, a switch code, or a stop code depending upon the operational programming desired. The functions of the several codes last mentioned will shortly be explained. These punched tapes used with the data translation system herein described, and having data addresses identified by an 8-level code bit, can be prepared as a by-product tape of the printer either by manual key lever operation or by suitable programmed control of the printer by a program tape or edge-punched card read by the printer tape reader. The motorized reader includes seven manual switches which can be operated in various combinations to select any one of the 127 different address codes available, or any one of these addresses may be specified by an address code recorded in the tape of the printer tape reader. The address of information for which a search is to be made in the motorized reader tape thus can be supplied either by the manual setting of these seven switches or by an address supplied from the punched tape read by the printer tape reader.

Whenever an address identified information item or block of information is desired from the punched tape of the motorized reader, the operation of the latter is controlled to initiate a search at a high reading rate until the information is found. This search may be initiated manually, in which event the identifying address is normally established by manual operation of the seven address selection switches earlier mentioned, or may be initiated automatically under control of information read from the tape at either reader. If the search is initiated by the printer tape reader, an address identification code (referred to herein as an AID code) is first read and this is followed by the address of the information sought; the address thus provided by the printer tape reader is stored in the motorized tape reader which immediately begins the search and continues it until the addressed information is located. While this search is in progress, the printer tape reader continues normal operation until it reads a switch code which thereupon halts the printer tape reader and transfers control of all subsequent operations to the motorized tape reader. If the latter has located the addressed information and has halted awaiting the switch code, it responds to the latter and proceeds to read the addressed information to the printer for reproduction or to a tape punch or punches for recording of the information should the operation at that time be of the non-print character. If the addressed information has not been located at the time the switch code is read by the printer tape reader, the latter nevertheless halts its operation and the motorized tape reader continues its search and immediately reads the addressed information as soon as it is located.

Now if the addressed information is terminated by a further search command, the motorized reader immediately initiates a new search for information having the same address as that last sought and in this instance reads the addressed information out as soon as it is located. If the addressed information is terminated by a stop code, the motorized reader operation halts to permit a further manual operation. This may include a new address selection effected by manual setting of the seven address switches earlier mentioned, or may include one or more manual printing or other desired manual operations. Resumed operation by use of either reader is available and is effected manually. If the addressed information read-out by the motorized reader is terminated by a switch code, this code causes immediate halt of operation of the motorized reader and initiates further operation of the printer tape reader.

This alternate transfer of reader operation between the printer tape reader and the motorized tape reader is hereinafter referred to for convenience as duplex operation, and is effected only upon manual setting of a duplex switch provided for this purpose. Where the record medium read by the printer tape reader does not itself record address identity information but merely utilizes a switch code, it is possible manually to select an address by means of the seven address selection switches and thereafter manually to actuate the motorized reader search switch to effect a single search operation all of which may be accomplished while the printer tape reader is continuing through a period of its operation. Now the subsequent reading of a switch code by the printer tape reader simply effects read-out by the motorized tape reader of the information located by this manual operational procedure.

A typical result of the duplex mode of operation last described is illustrated in FIG. 1 which involves the preparation of a form letter. All information not underscored in this letter is supplied to the printer from the printer tape reader whereas all underscored information is supplied from the motorized tape reader or a manual data selector as indicated by the following Table A which lists typical variable data available for selection by an appropriate address identification code.

Table A

| Aid Code | Data |
| --- | --- |
| 1 | to acknowledge orders. |
| 2 | production orders. |
| 3 | sales orders. |
| 5 | invoices. |
| 6 | (abcdefg). |
| 12 | Mr. John A. Jones 377 High Street New York, New York Jones. |
| 23 | Mr. William Green 132 Louisa Street Williamsport, Penna. Green |
| 31 | (shoes). |
| 32 | (ties). |
| 33 | (shirts). |
| 123 | ($50.00). |
| 125 | ($100.00). |

Data Select Code, 12345,0, Selects 27.
Data Select Code, 12345,-, Selects (123456).

It will be noted from the example of FIG. 1 that the printer tape reader upon being manually placed into operation begins with a tabulation operation and prints the month, after which a data select code is read by which to obtain the day of the month from the manual data insertion unit. After reading the day from this unit, a return is automatically made without further command to the printer tape reader for typing of the year and carriage return to begin typing the name and address of the addressee. By way of illustration, the example of FIG. 1 indicates that before completion of printing of the month the printer tape reader requests that a search start for information having the address identity represented by code 12. From Table A, it will be noted that the information addressed by the printer tape reader is comprised by the name and address of the addressee. The search for this data is immediately started by the motorized tape reader and proceeds concurrently with further operation of the printer tape reader and intervening supply of the date by the manual data insertion unit.

The information which is the subject of the search by the motorized reader is automatically read out by the latter when located and upon receipt of a switch code read by the printer tape reader following the printing of the date and appropriate positioning of the form to receive the addressed information. This addressed information includes a switch code which returns the operation to the printer tape reader where the form is again spaced and the salutation printed out up to the point where the addressee's name should appear, whereupon a switch code is read to return the operation to the motorized tape reader and complete read-out of the last word "Jones" of the addressed information. Note in this that no new data search was called for between read-out of the first portions of the addressed information and read-out of the last word of the addressed information by the motorized tape reader. Read-out of the name "Jones" by the motorized tape reader is followed by a switch code which returns the operation to the printer tap reader.

The printer tape reader upon completing the print-out of the first word of the letter is shown by way of illustration as calling for a new search by the motorized reader for information identified by the code address 1, but the printer tape reader after calling for this search continues operation until it reads a switch code near the end of the paragraph to transfer operational control again to the motorized reader. The latter upon completing its search proceeds to read out the words "to acknowledge orders" and then reads a switch code which transfers the operation back to the printer tape reader.

Shortly after the printer tape reader resumes operation, it again calls for a search for information identified by the address code 5 and shortly thereafter again reads a switch code to transfer operation to the motorized reader which finds the addressed information and reads out the word "invoices" followed by a switch code which returns the operation to the printer tape reader.

This alternate supply of data information to the printer from the two tape readers continues as indicated in FIG. 1 to the completion of the letter. In this, it will be noted as explained in the second paragraph of the letter that the name and address of the addressee was automatically recorded in a by-product tape by the tape punch unit associated with the printer and under program control of the printer tape reader. It will further be noticed that in the preparation of the last paragraph the printer tape reader during printing of the last sentence read a second data select code to receive further data "(123456)" manually set up in the manual data selector. As in connection with the printing of the date, the printer tape reader automatically resumed control upon completion of this read-out of information from the manual data selector. It may further be noted, as indicated in the last sentence of the letter, that repeat search operations by the motorized tape reader may be effected by terminating each block of addressed information with the address identify code (AID). This repeat search operation continues automatically to locate further data having the address previously supplied by the printer tape reader and now stored in the motorized tape reader. The repeat search is shown as interrupted by a stop code to enable a new address to be manually set up by the manual address selection switches and a manual carriage return operation to be effected, after which the repeat search is manually restarted and continues for all information having the latter address. The great flexibility and utility of the duplex form of system operation will be evident from this simple example of the results which it is capable of accomplishing.

If the duplex switch previously mentioned is not manually actuated to its duplex position, the operations of each reader are as described except that any switch code read during operation of either reader is ignored by that reader and the operation of the reader continues as though the switch code did not exist. This type of operation is particularly useful in connection with the motorized tape reader by which to effect searches for single items or blocks of information identified by an address manually set up in the seven address switches earlier mentioned or by which all information having a given identifying address may be collected and printed or re-recorded in a by-product tape by a repeat search. To effect a single search, the addressed information is terminated by a stop code. A further search for information identified by the same address may then be effected simply by pressing a motorized reader search switch, or the address of the information desired may be changed before actuation of the latter switch. If all information identified by the same address is to be collected, this may be effected in either of two manners. In the first of these, all data is terminated by a stop code and collection is effected by repeated manual actuations of the motorized reader search switch. The second manner of collection is automatic, and involves the pre-recording of an address identification code (AID) terminating each item or block of information to be collected, so that the motorized reader begins a new search immediately upon completing read-out of the information located by the preceding search.

The motorized reader performs its searching operation at a much higher reading rate than is permissible when information is to be read-out to the printer or by-product tape punch. Upon completion of each search and the initiation of an information read out operation, the reading rate of the motorized tape reader is automatically reduced to the highest rate at which the information can be utilized by the printer or by-product tape punch. This control of the motorized reader reading rate thus minimizes the required search time while permitting the system operation at the maximum rate which the printer or by-product tape punch can receive and utilize the information without operational error.

SYSTEM ELECTRICAL CIRCUIT ARRANGEMENT

The electrical circuit arrangement of the data translation system of the present invention is shown in FIGS. 2a–2g, which should be considered together arranged as shown in FIG. 2.

1. OPERATION UNDER CONTROL OF THE PRINTER TAPE READER

The system includes a manually actuable printer reader start read switch S1 which, upon actuation, opens a pair of contacts S1a and closes a pair of contacts S1b to energize a reader control relay PRRC and a switch unlatch magnet PRS of a switch relay SW through a circuit which includes the normally closed contacts SCRT of the printer. The latter contacts are opened and remain open during each carriage return or tabulation operation of the printer. The unlatch magnet PRS operates in association with a magnet MRS of the switch relay SW. Upon energization of the magnet MRS, the switch relay SW moves its contacts to (and mechanically latches them in) one position enabling operation of the motorized tape reader. Subsequent energization of the unlatch magnet PRS serves to unlatch the contacts of the switch relay SW and position them to enable operation of the printer tape reader. FIG. 2 shows the switch relay contacts in the last mentioned (unlatched) position. The relay PRRC having been thus energized is thereafter maintained energized through a hold circuit which includes the relay contacts 21 and 22 of a punch error relay RPE, the relay contacts PRRC 1—2 now closed, the tape reader tape contacts PSRT which are closed when a tape is in the printer tape reader in readiness to be read, normally closed stop-code 1—2—4 reader contacts of the printer tape reader contact bank 13, the contacts 28L and 29L of the switch relay SW now closed, a motorized reader stop switch S2, and a printer reader stop switch S3.

When the start read switch S1 is manually released and returns by spring bias to the position in which its contacts S1a are closed and its contacts S1b open, a relay RFC is energized through a circuit which includes the now closed contacts 2L and 3L of the switch relay SW, a conductive link 10 connecting circuit terminals 11 and 12, the cam actuated contacts STC1 of the printer which are closed each time the printer completes a cycle of its operation, the normally closed contacts 23 and 24 of a delay control relay RDC provided in the printer for purposes presently to be described, the normally closed contacts of a switch S4 which is provided in the printer and which is actuated by any of several key levers effecting printer functions requiring a temporary halt in the printer tape reader operation, the normally closed contacts S5a of a motorized reader start read switch S5, the normally closed contacts S6a of a printer non-print switch S6, the now closed contacts S7a of a printer skip switch S7, the normally closed contacts S1a of the start read switch S1, and the normally closed contacts SCRT earlier mentioned. The contacts 5 and 6 of the relay RFC now close to remove the printer cam actuated contacts STC1 from the energizing circuit last traced.

The printer tape reader is now placed in operation by energization of its reader clutch magnet PRC through a circuit which includes the now closed contacts 3 and 4 of the relay PRRC, and the now closed contacts 3 and 4 of the relay RFC to the energizing circuit of the relay RFC last traced. The reader operation normally continues until its reader contact bank 13 reads a stop code 1—2—4 or either of the stop switches S2 or S3 is manually actuated, all of which interrupt the hold circuit earlier described of the reader control relay PRRC, thereupon deenergizing this relay and causing its contacts 3 and 4 to interrupt the energizing circuit of the reader clutch magnet PRC. Thus it will be seen that the printer tape reader once placed in operation will continue reading its tape until it reads a stop code 1—2—4 or a stop switch is actuated.

Figure 2G:
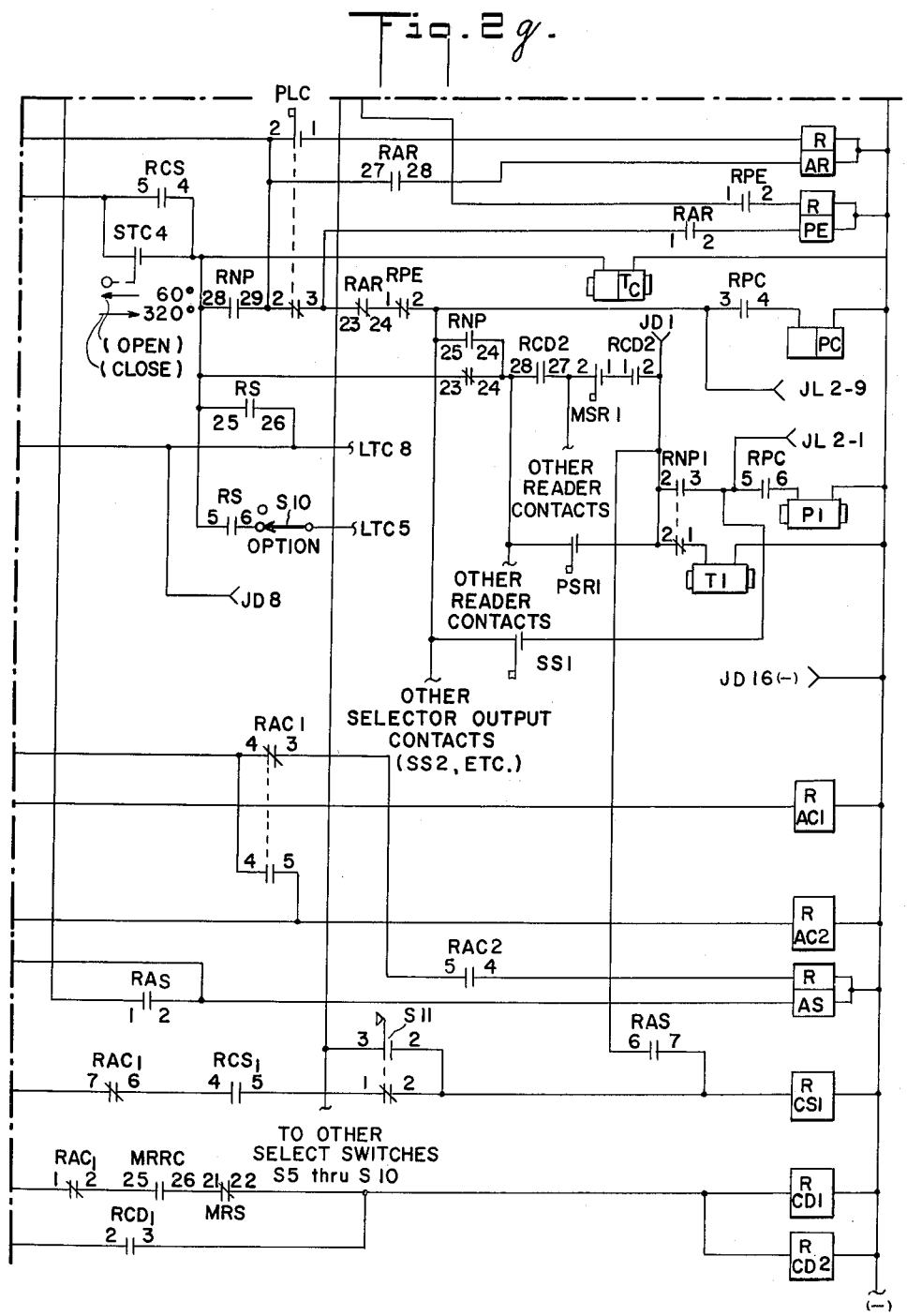
Figure 3B:
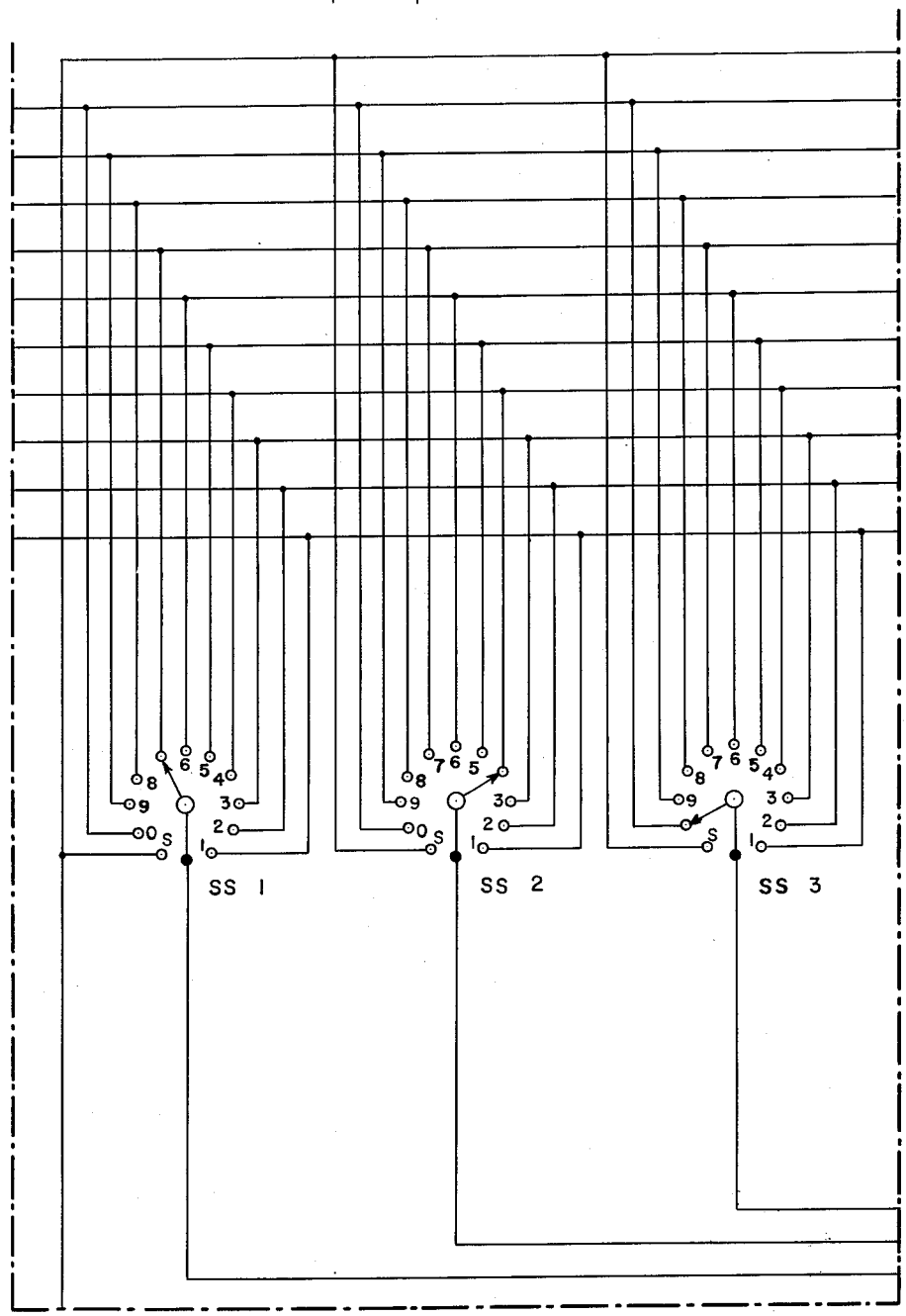
Figure 3C:
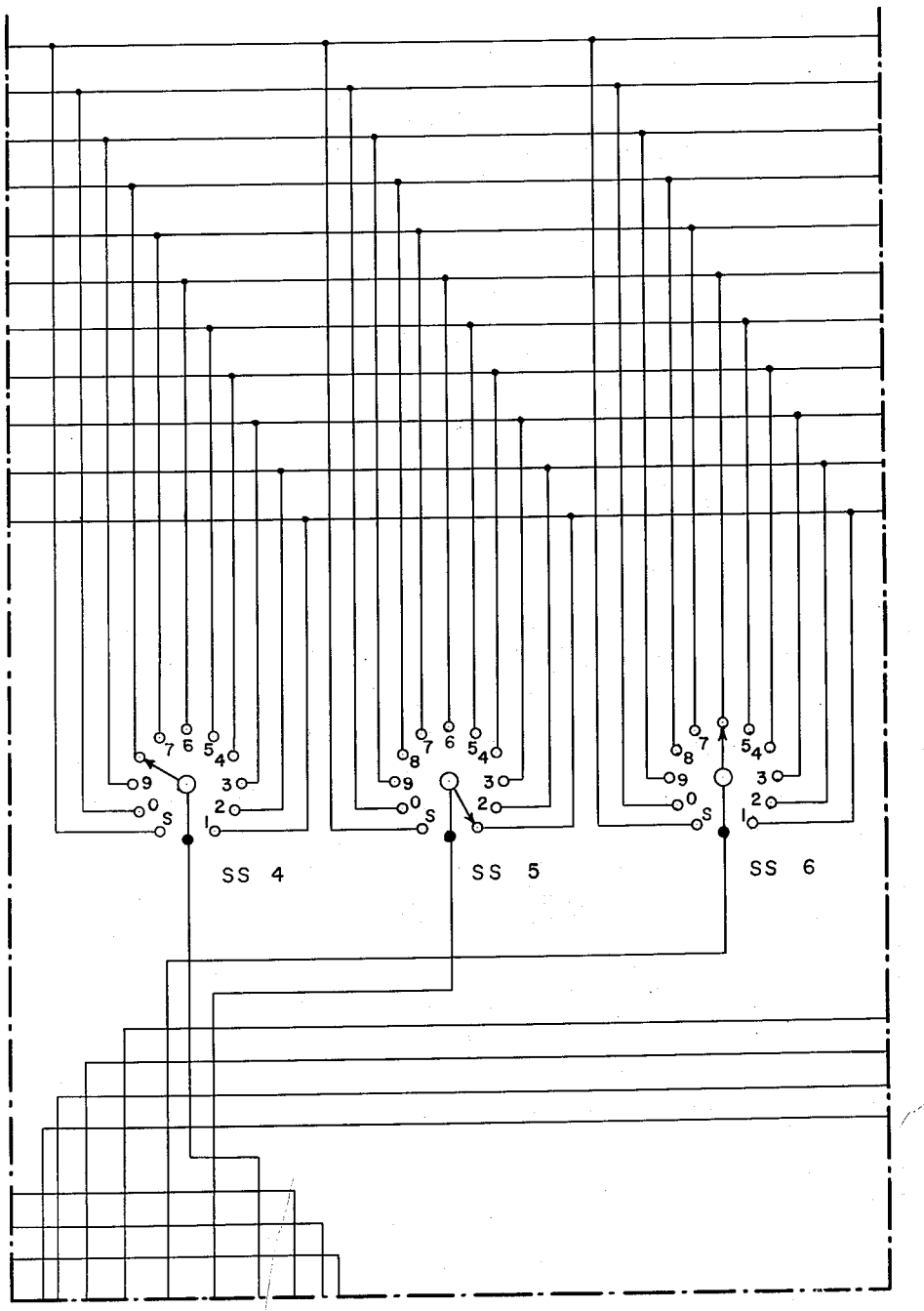
Figure 3D:
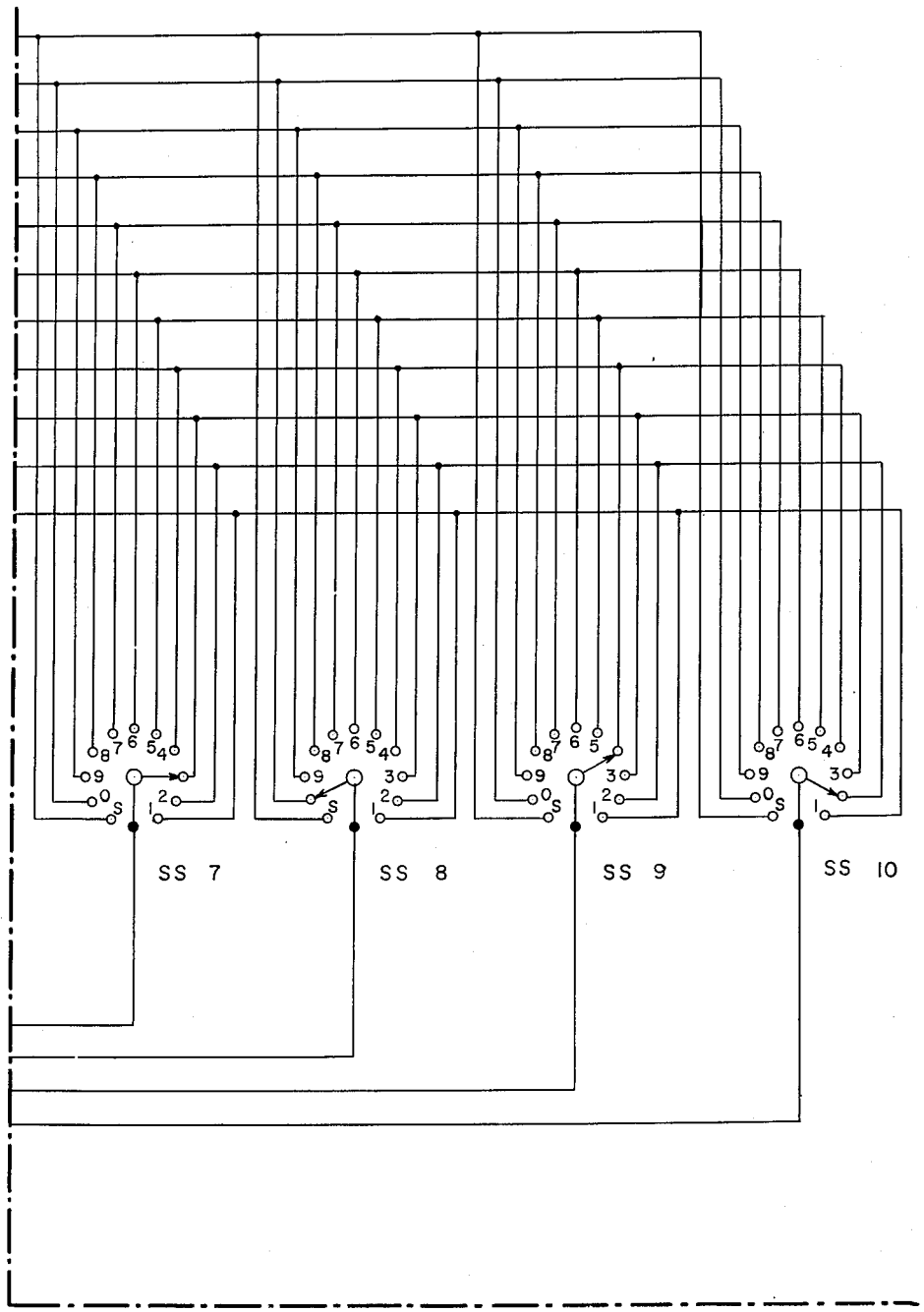
Figure 3F:
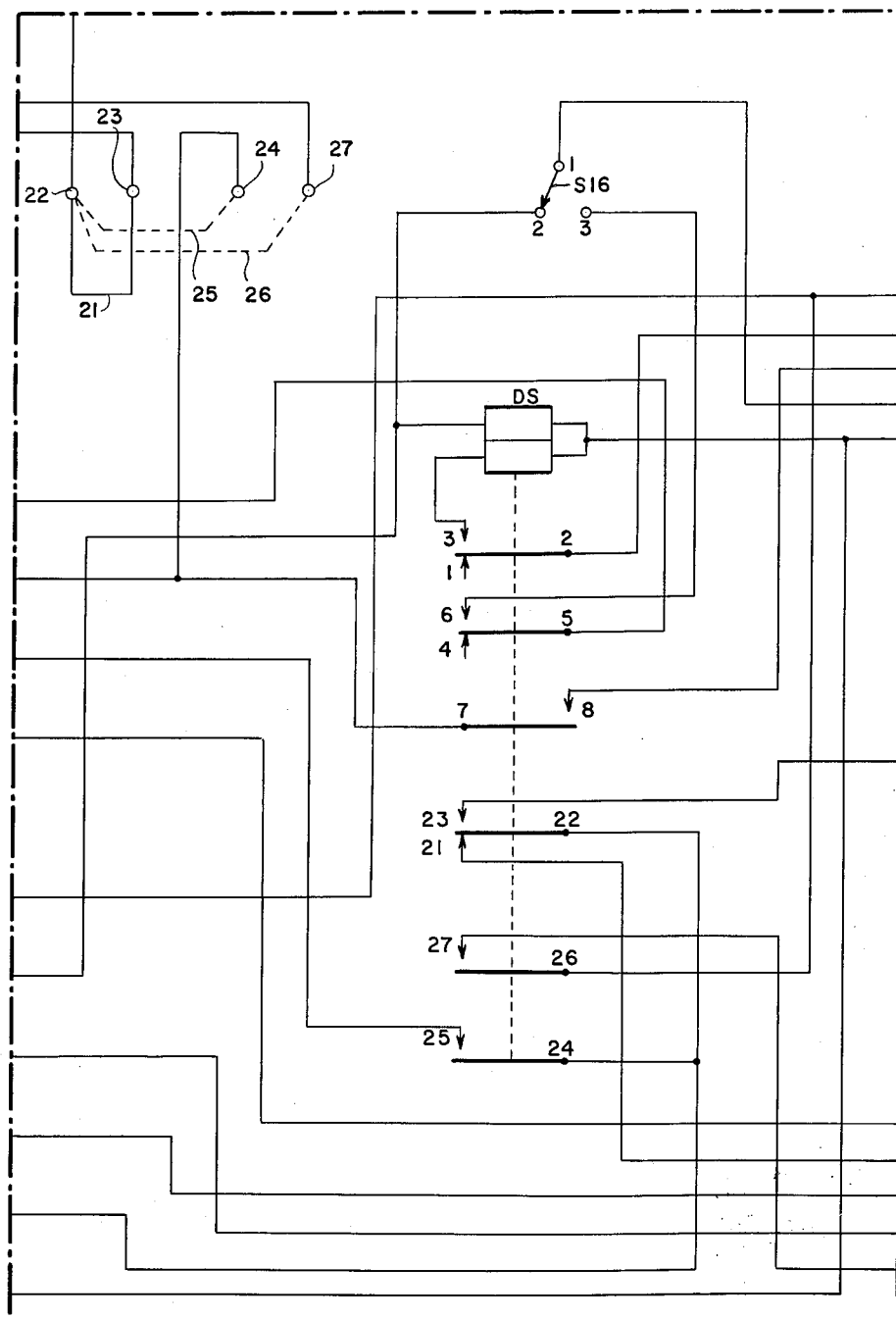
Figure 3G:
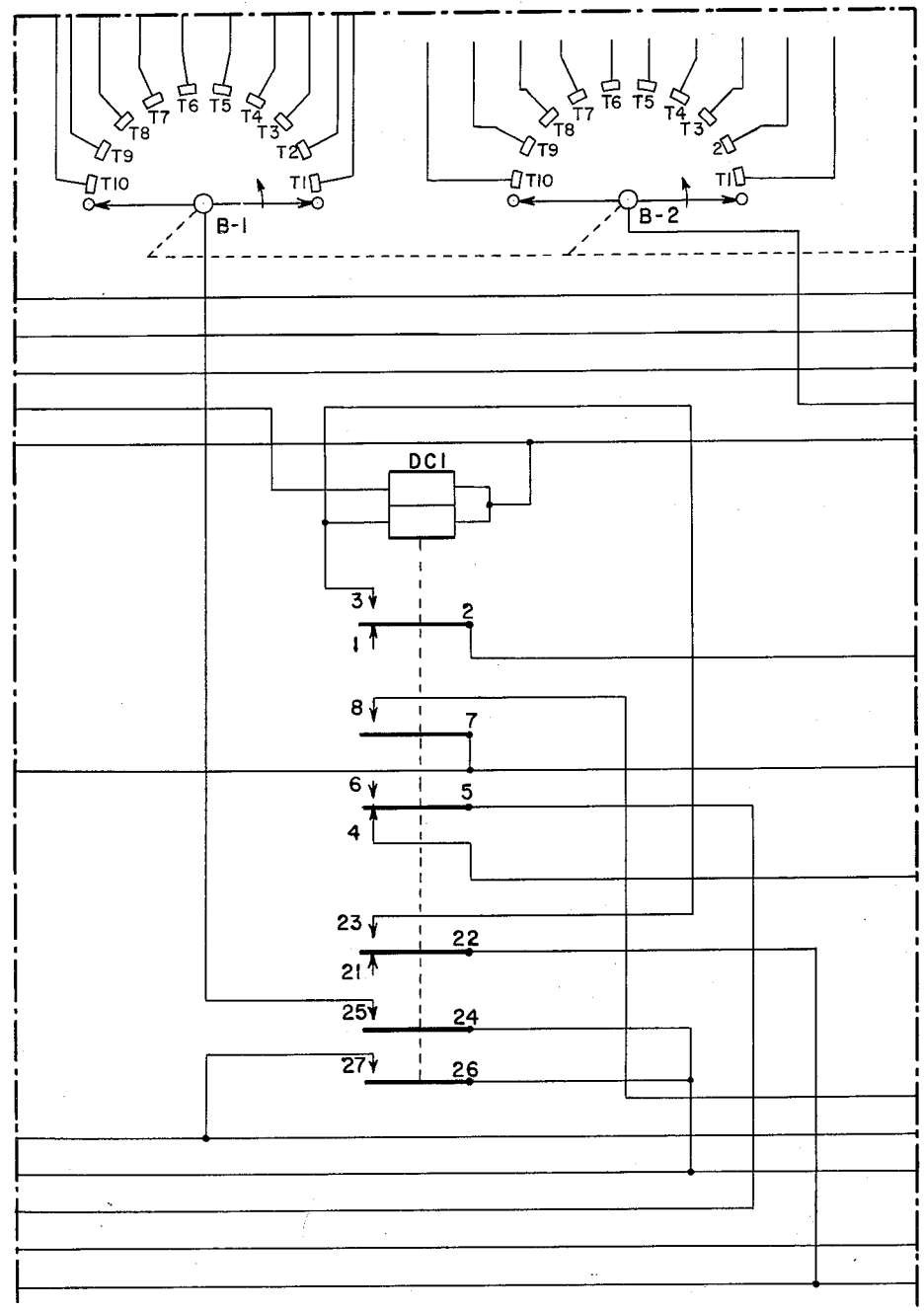

While the reader thus operates, it supplies the information read from its tape to the printer or to the by-product tape punch as explained more fully in the aforementioned Blodgett and Blodgett et al. patents. In here briefly reviewing this operational phase of the system, only those components of the first-code-level are shown for simplicity, but it will be understood that similar components are provided for code levels 2 through 8 as more fully disclosed in the Blodgett et al. Patent No. 2,905,298. The printer tape reader includes plural code reading contacts of which for simplicity as just noted only the first level contacts PSR1 are shown in FIG. 2g. When these close by reading a one level code bit, they energize a printer code translator magnet T1 through a circuit which includes normally closed contacts 1 and 2 of a non-print relay RNP1, the normally closed contacts 23 and 24 of a further non-print relay RNP, the cam actuated contacts STC4 which are closed at 320° of one printer cycle and open at 60° of the next printer cycle, normally open reader common contacts PSRC, which close at approximately 180° of the tape reader cycle while the reader pins are in reading position, a switch 15 which in one position completes the energizing circuit here considered through the normally closed contacts 3 and 4 of the delay control relay RDC to the normally closed carriage return contact SCRT or which in the other position of the switch 15 completes the energizing circuit through normally closed contacts 6 and 7 of an automatic non-print relay RANP and the normally closed contacts 21 and 22 of a further non-print relay RNP2 to the normally closed contacts 3 and 4 of the delay control relay RDC. The function of the switch 15 in completing the alternate energizing circuits last described will be explained hereinafter in connection with the automatic non-print operation. The translator clutch magnet TC is energized directly by the printer cam actuated contacts STC4 of the energizing circuit last described, and this energization of the translator clutch and translator magnets (T1 and other translator magnets, not shown, in accordance with the information code read) effects automatic key lever actuations of the printer in reproducing printed copy.

If it should be desired that a portion or all of the information printed be recorded in a by-product tape, a punch control relay RPC is energized (in a manner presently to be explained) to close its contacts 3 and 4 by which to energize a punch clutch magnet PC through the reader common contacts PSRC and to close its contacts 5 and 6 by which to energize a first-code-level punch magnet P1 (the higher level punch magnets being omitted for simplicity as previously explained) through the printer code selector contacts SS1 (other such selector contacts being provided for the higher level punch magnets) actuated in conformity with the particular functional operation performed by the printer. The punch structure and its complete mode of operation are described in the aforementioned Blodgett et al. Patent No. 2,905,-298, and it may here merely be added that contacts 1 and 2 of a punch latch contact PLC and a key-lever common contact SSC (actuated in common by all of the printer key levers) together energize an anti-repeat relay RAR in the event that the key lever actuations should occur at a rate (by manual key lever operation) higher than the cyclic periodicity of the punch. Should this occur, the contacts 27 and 28 of the relay RAR close to maintain the latter energized through the contacts SSC alone and the contacts 1 and 2 of the relay RAR energize a punch error relay RPE if the relay RAR is yet energized when the contacts 2 and 3 of the contact PLC again close. The relay RPE if energized holds through its contacts 1 and 2 and the start read switch S1. The contacts 21 and 22 of the punch error relay RPE interrupt the hold circuit of the printer read control relay PRRC to de-energize this relay and require that the printer be manually re-started by actuation of the start read switch S1 to interrupt the hold circuit of the relay RPE and re-energize the reader control relay PRRC as described above. The normally closed contacts 3 and 4 of the punch error relay RPE are opened by energization of the latter and when so opened lock up the key levers of the printer against actuation by de-energization of a key-lock magnet KL (FIG. 2a).

The punch control relay RPC may be energized directly through manual actuation of a punch control switch S8 to close its contacts 1 and 2 by which all data information printed is recorded by the by-product tape punch. If the switch S8 is manually moved to its punch select position at which its contacts 1, 3 and 4, 5 are closed, the by-product tape punch is turned ON and OFF under program control of the printer tape reader. Programmed turn ON of the by-product tape punch is effected by energizing a punch select relay RPS, which closes its contacts 5 and 6 to energize the punch control relay RPC through the normally closed contacts 1 and 2 of a punch ON printer program actuated contact SS B—R and the now closed contacts 1 and 3 of the punch select switch S8. The punch select relay RPS is itself energized through the normally open contacts 2 and 3 of the printer program controlled contacts SS B—R when selectively actuated and the now closed contacts 1 and 3 of the punch select switch S8. The punch select relay RPS is held through its normally open contacts 1 and 2, the normally closed contacts of a printer program controlled punch OFF contact SS B—U, and the now closed contacts 4 and 5 of the punch select switch S8. A punch ON code read by the printer tape reader causes actuation of the punch ON contacts SS B—R to energize the punch select relay RPS which in turn energizes the punch control relay RPC as just described, and a punch OFF code read by the printer tape reader actuates the punch OFF contacts SS B—U to de-energize these relays.

The printer herein described, as in the aforementioned Blodgett et al. Patent No. 2,905,298, may be manually and program controlled to effect non-printing of information read from either the printer tape reader or the motorized tape reader. The information not so printed may, however, be recorded in a by-product tape by manual or program control of the by-product tape punch as last described. Manual non-print control is effected by manually actuating the non-print switch S6 to open its contacts S6a and close its contacts S6b. Opening of the contacts S6a interrupts the energizing circuit of the reader clutch magnet PRC to halt the operation of the printer tape reader, and closure of the non-print switch contacts S6b energizes a manual non-print relay RMNP through a circuit which includes normally closed contacts 21 and 22 of an automatic non-print relay RANP and the normally closed contacts 21 and 22 of a skip relay RS. The manual non-print relay RMNP closes its contacts 23 and 24 to pick up non-print relays RNP 1 and 2 (for simplicity here shown as comprised by a single relay) while the non-print switch S6 is still actuated to close its contacts S6b. These relays remain energized through the now closed contacts 26 and 27 of the relay RNP2, the now closed contacts 7 and 8 of the relay RMNP and either the pair of contacts 1R and 2R of the switch relay SW to the hold circuit for the relay PRRC or the pair of contacts 2R and 3R of the switch relay SW to the hold circuit of the relay MRRC depending upon whether the printer tape reader or motorized tape reader is reading at this time. An auxiliary hold circuit for the relays RMNP and RNP 1—2 includes the contacts 25 and 26 of the relay RMNP, the contacts 9 and 10 of the relay RNP2, and the printer tape reader common contacts PSRC 3, 4, whereby these relays shall always remain energized until the end of a reader cycle.

While the non-print relay RNP (1 and 2) remains energized, its contacts 1 and 2 open and its contacts 2 and 3 close to remove the translator magnet T1 from the reader contacts PSR1 and connect the latter to the punch magnet P1 if the punch control magnet RPC is energized at this time to close its contacts 5 and 6 (other contacts not shown of the relay RNP 1–2 effect like transfer between the reader contacts and the translator and punch magnets as more fully disclosed in the aforementioned Blodgett et al. Patent No. 2,905,298). At the same time, the energizing circuit of the reader contacts PSR1 is modified by transfer of the contacts 23, 24 and 24, 25 of the non-print relay RNP so as to include contacts 1 and 2 of the punch error relay RPE, contacts 23 and 24 of the anti-repeat relay RAR, the normally closed contacts 2 and 3 of the punch latch contact PLC, and the now closed contacts 28, 29 of the non-print relay RNP so that the energization of the punch clutch magnet PC is interrupted each punch cycle by operation of the punch latch contacts PLC. The energizing circuit here considered is completed for one position of the switch 15 directly to the contacts 3 and 4 of the delay control relay RDC and is completed in the other position of the switch 15 through the normally closed contacts 6 and 7 of the automatic non-print relay RANP and the now closed contacts 5 and 6 of the manual non-print relay RMNP to the contacts 3 and 4 of the delay control relay RDC. Actually the alternate positioning of the switch 15 has relation only to the automatic non-print operation as will presently be explained.

Now as soon as the non-print switch S6 is manually released and again closes its contacts S6a, the energizing circuit of the reader clutch magnet PRC is re-established and the printer tape reader resumes operation. As mentioned above, the reader will continue operation until such time as the reader contact bank 13 reads a 1—2—4 stop code or the printer stop switch S3 is manually actuated.

The automatic non-print operation is similar to that just described except that it is initiated when the printer tape reader reads an automatic non-print code 3—4—5. When this occurs, the reader contact bank 14 energizes an automatic non-print relay RANP and the contacts 1—2, 27—28, and 29—30 of the latter close to complete a hold circuit for this relay through the contacts 5L—6L, 25L—26L, and 4R—5R of the switch relay SW and the normally closed print restore code 3—4—6 contacts of the printer reader contact bank 13. Note in this respect that the reader contact bank 14 is unable to energize the automatic non-print relay RANP as last mentioned during a manual non-print operation since the energizing circuit of these contacts is interrupted by the contacts 21 and 22 of the manual non-print relay RMNP. The non-print relay RNP is thereupon energized through the contacts 9 and 10 of the automatic non-print relay RANP, the now closed contacts 22L and 23L of the switch relay SW, and the reader contacts 4 and 5 of the printer tape reader common contact PSRC when the latter close at the completion of the reader cycle during which the automatic non-print code 3—4—5 was read. The non-print relay RNP 1—2 is held through its now closed contacts 9 and 10 and the contacts 3 and 4 of the reader common contacts PSRC during a reader cycle and continues to remain energized at the end of the reader cycle in the manner last explained, it being noted that the reader common contacts 3 and 4 and contacts 4 and 5 both make before break during the reader cycle. The functions performed by the non-print relay RNP 1—2 are those just described with respect to the manual non-print operation and will not be repeated. There are, however, one or two differences, aside from the manner of terminating the operations, between the automatic non-print and manual non-print operations which will now be considered.

It was previously explained that the hold circuit of the reader control relay PRRC extended through the stop code contacts of the reader contact bank 13; in the automatic non-print operation the latter stop contacts are no longer included in the hold circuit of the relay PRRC which now extends through the now closed contacts 8L— 9L of the switch relay SW, the now closed contacts 25 and 26 of the automatic non-print relay RANP, and the normally closed contacts of the stop switches S2 and S3. Thus a stop code 1—2—4 read by the printer tape reader is no longer effective to terminate an automatic non-print operation which can be terminated only by reading a print restore code 3—4—6 by the bank of reader contacts 13 to interrupt the hold circuit for the relay RANP. Also whereas the manual non-print operation can be terminated by manual actuation of the printer stop switch S3, in the automatic non-print operation actuation of the switch S3 to close its contacts S3b now establishes an alternate holding circuit for the reader control relay PRRC to prevent halt of the automatic non-print operation by actuation of the switch S3. This holding circuit may be traced from the contacts S3b of the print stop switch S3 and through the now closed contacts 4 and 5 of the automatic non-print relay RANP to the hold circuit last mentioned. During an automatic non-print operation, operation of the manual non-print switch is ineffective to energize the manual non-print relay RMNP since this energizing circuit is interrupted at the normally closed contacts 21 and 22 of the automatic non-print relay RANP.

The significant purpose of the switch 15 earlier mentioned has relation to the recording or non-recording in the by-product tape of the print restore code. With the switch 15 positioned to complete the energizing circuit of the punch clutch magnet and punch magnets through the contacts 3 and 4 of the delay control relay RDC, a print restore code 3—4—6 is not effective to interrupt the energizing circuit and the print restore code read by the reader is thus recorded in the by-product tape. Transfer of the switch 15 to complete the energizing circuit for the punch through the now closed contacts 7 and 8 of the automatic non-print relay RANP and the reader contact bank 13 causes this energizing circuit to become de-energized upon reading a print restore code and the latter is accordingly not recorded in the by-product tape.

A skip operation may also be initiated manually and is terminated either by reading a skip restore code 1—3—4 or by manual actuation of the stop read switch S3. A manual skip operation is initiated by actuation of the skip switch S7 to close its contacts S7b and to open its contacts S7a. The latter interrupt the energizing circuit of the printer tape reader clutch magnet PRC, and the contacts S7b effect energization of a skip control relay RCS through normally closed contacts 1 and 2 of the manual non-print relay RMNP. The skip relay RCS upon picking up establishes a hold circuit through its now closed contacts 1 and 2, the now closed contacts 5 and 6 of the reader control relay PRRC, and the skip restore code 1—3—4 contacts of the reader contact bank 13. The now closed contacts 8 and 9 of the skip control relay RCS directly energize a reader skip relay RS, but the latter may also hold through its now closed contacts 3 and 4 and the normally open contacts S3b of the stop switch S3 should the latter be manually actuated.

At the same time, the contacts 29 and 30 of the skip control relay RCS establish a hold circuit for the read control relay PRRC around the stop code contacts of the reader contact bank 13 to insure that a skip operation shall not be terminated by reading a stop code. The now closed contacts 4 and 5 of the skip control relay RCS bypass the printer cam actuated contacts STC4 to maintain the printer translator clutch TC continuously energized, and the now closed contacts 25 and 26 of the skip relay RS maintain the translator magnet 3 continuously energized which has the effect on the translator operation that it prevents selection by the translator of all printer key levers with the exception of the carriage return key lever. Even the translator actuation of the carriage return key lever may be prevented if desired by the setting of a switch S10 in the position shown, whereby the now closed contacts 5 and 6 of the skip relay RS maintain the translator magnet T5 continuously energized. While the skip operation is in progress, the contacts 1 and 2 of the skip relay RS de-energize the reader contact bank 14 so that no new automatic type of printer operation may be effected by reading an operational code. Thus an automatic non-print code 3—4—5 if read at this time is ineffective to initiate an automatic print operation.

Certain functions of the printer require a delay in the reader operation until the printer function is completed. Typical of these are the carriage return and tabulate operations. For these operations, printer contacts S4 are key lever actuated to energize a delay control relay RDC which thereupon maintains a hold circuit for itself through its contacts 1 and 2, the start read switch S5, the non-print switch S6, the skip switch S7, the start read switch S1, and the carriage return and tabulation contacts SCRT which open as soon as the carriage return or tabulation operation starts and remain open to its completion. Thus the delay control relay RDC is only briefly energized to perform certain functions to the required delay. The normally closed contacts 23 and 24 of the delay control relay RDC open upon energization of this relay to interrupt the energizing circuit of the printer reader clutch magnet PRC and halt the printer operation which does not resume until the controls SCRT again close, and the normally closed contacts 3 and 4 of the reader delay control relay RDC open to de-energize the energizing circuit through the switch 15 (in the position shown) of the printer code translator and by-product tape punch until the delay control relay RDC is again de-energized.

2. OPERATION UNDER CONTROL OF THE MOTORIZED TAPE READER

There are two modes of the system operation under control of the motorized tape reader. One of these is quite similar to that previously described for the printer tape reader while the other mode of operation is quite different. These will now be considered in turn.

(a) *Data reading without search.*—To accomplish data reading without searching, the system includes a motorized reader start read switch S5 which places the reader in operation by energization of a motor read control relay MRRC while concurrently energizing the switch relay magnet MRS to transfer the numerous contacts of the switch relay SW and reverse their open circuit and closed circuit positions as shown in FIGS. 2a–2g. As previously noted, the switch relay when thus energized latches its contacts in their transferred position. A hold circuit for the reader control relay MRRC is established through its contacts 23 and 24, the normally closed contacts 23 and 24 of the punch error relay RPE, the motor reader tight tape contacts MSTT (which are normally closed but open upon the tape becoming excessively tight for any reason during operation of this reader), the motor reader tape contacts MSRT which are closed when tape is positioned in the reader in readiness to be read, the stop-code 1—2—4 reader contacts of the motor reader contact bank 16, the now closed contacts 22R—23R of the switch relay SW, and the normally closed contacts S2a of the motor stop switch S2 and the normally closed contacts S3a of the printer reader stop switch S3.

As soon as the read control relay MRRC is thus energized, its now closed contacts 25—26 energize relays RCD1 and RCD2 through a circuit which includes the normally closed contacts 21—22 of a motor search relay MRS, the now closed contacts 25—26 of the relay MRRC, the normally closed contacts 1 and 2 of a relay RAC1, the normally closed contacts 1 and 2 of a relay RAC2, a diode rectifier CR2, the normally closed contacts 2 and 3 of a motor reader common contact MSRC, and the normally closed contacts of a motor search switch S12, the motor reader stop switch S2, and the print reader stop switch S3.

Energization of the relays RCD1 and RCD2 now places the motor reader in operation by energization of its read clutch MRC through the cam actuated contacts SRC1 of the motor reader which close at 225° of one reader cycle and open at 20° of the next reader cycle and which are thus closed when the motor reader is quiescent, the now closed contacts 7 and 8 of the read control relay MRRC, the normally closed contacts 1 and 2 of the motor search relay MRS, the now closed contacts 29 and 30 of the relay RCD2, the normally closed contacts 21 and 22 of the relay RFC (the latter being de-energized when the contacts 1L, 2L and 3L of the switch relay SW transferred), normally closed contacts 21 and 22 of both relays RAC1 and RAC2, the now closed contacts 1L and 2L of the switch relay SW, the conductor 10, the normally closed cam-actuated contacts STC1 of the printer, the normally closed contacts 23 and 24 of the delay control relay RDC, and the normally closed contacts of the switches S4, S5, S6, S7, S1 and contacts SCRT.

The motorized tape reader in being thus placed in operation reads successive data code groups and its reader contacts, of which only the first-code-level contact MSR1 (FIG. 2) is shown, energize corresponding ones of the printer translator magnets such as the first-level magnet T1 or punch magnets such as the first-level magnet P1. It will be understood that, as in the case of the printer tape reader contacts PSR1, there are higher-level code-bit motor reader contacts not shown for simplicity, and that these energize higher level printer translator magnets and punch magnets also not shown for simpilcity as previously explained. The energizing circuit for the motor reader contacts, as contacts MSR1, extends through the now closed contacts 1 and 2 of the relay RCD2, the contacts 27 and 28 of the relay RCD2 and the normally closed contacts 23 and 24 of the non-print relay RNP to the same remainder of the energizing circuit as described with respect to the operation of the printer tape reader. Also in similar fashion to the latter, the contacts 8 and 9 of the motorized reader common contact MSRC effect energization of the motor reader contacts MSR1 and the translator clutch TC of the printer through the now closed contacts 9 and 10 of the relay RCD1 and the printer cam actuated contacts STC4. This energizing circuit and its general operation are similar to that previously described with respect to the printer tape reader.

Thus the motor reader clutch MRC upon being energized initiates a cycle of operation of the motor reader to read a data code group to the printer. This data may also be recorded by the by-product tape punch, if such is desired, in the manner previously described. The motor reader having initiated the printer through a cycle of operation is, however, prevented from itself starting a new cycle of reader operation since the motor reader clutch MRC is de-energized by the opening of the printer cam-actuated contacts STC1 at the 150° point of the newly initiated printer cycle. The next motor reader reading cycle begins near the end of the printer cycle when the printer cam-actuated contacts STC1 close at 250° of the printer cycle to re-energize the reader clutch magnet MRC. It is in this manner that the normal higher reading rate of the motor reader is reduced to the lower cyclic operating rate of the printer during all read out of data information from the motor reader to the printer.

The motorized reader having thus been placed in operation will continue to read, as in the case of the printer tape reader, until the motorized tape reader reads a stop code 1—2—4 by its contact bank 16 to interrupt the hold circuit and thus drop out the reader control relay MRRC or until the motor stop switch S2 is manually actuated for the same purpose. Thus this mode of operation of the motorized tape reader is in all respects analogous to that of the printer tape reader earlier described, and data information may thus be read from the punched tape of either for reproduction by the printer or recording by a by-product tape punch or both. As with the printer tape reader, the motorized tape reader may read an automatic non-print code 3—4—5 by its contact bank 19 to energize the automatic non-print relay RANP and thereby effect an automatic non-print operation in the same manner earlier described. A manual non-print operation may also be effected by manual actuation of the non-print switch S6 to energize the manual non-print relay RMNP.

As previously pointed out, a principal function of the motorized reader is to read tape wherein information is recorded as information items or blocks of information preceded by an identifying address. The address of any information thus desired must be supplied to the motorized reader before it can begin its search for such information. The identifying address of desired information may be supplied either manually or from a punched tape in process of being read by the printer tape reader.

An address is manually supplied by actuation of address selection switches S11 (FIG. 2g), of which only the first-level address switch is here shown for simplicity but it will be understood that similar address switches for the code levels two through eight are provided and are manually set for purposes of energizing a first-level code-storage relay RCS1 and corresponding other higher-code-level storage relays not shown. In this, the electrical circuitry including for each code level a set of motor reader contacts, address switch, storage relay, and individual pair of relay RAS contacts is like that shown for the first code level. Upon completion of manual setting of the address switches S11 to the desired address identity of information sought, a motor search operation is manually initiated by actuation of a motor search switch S12 to open its contacts S12a and close its contacts S12b.

Assume that at the time of actuation of the switch S12 the switch relay SW had been left by the preceding operation with its contacts latched up in transferred position (i.e., the relay winding MRS had been energized later in point of time than the unlatch relay winding PRS). The contacts S12b now complete an energizing circuit for a motor search relay MRS through the motor reader cam-actuated contacts SRC2, which are closed between 265° of one motor reader cycle and 85° of the next cycle and thus are closed when the motor reader is stopped, and the normally closed contacts 1 and 2 of a mtor reader control relay MRRC. The motor search switch contacts S12b now also energize the address storage relays such as RCS1 and other like storage relays in accordance with the manual setting of the address selection switches S11 which remain set in their closed circuit or open circuit positions.

The storage relays and as RCS1 include contacts in a coincidence circuit 18; in particular, the first-code-level storage relay RCS1 has normally open contacts 2 and 3 which are in series with normally closed first-level code reading contacts 10 and 11 of the motorized reader and the relay RCS1 also includes normally closed contacts 1 and 2 connected in series with normally open first-level code reading contacts 9 and 10 of the motor reader. Thus if the storage relay RCS1 should be selected by operation of the switch S11, the relay contacts 2 and 3 of the relay RCS1 would complete an electrically continuous circuit between the conductors 20 and 20a of the coincidence circuit 18 through the normally closed first-level code reading contacts 10 and 11 of the motor reader. This electrical circuit continuity is interrupted if the motor reader reads a one-level code and thereby opens its first-level contacts 10 and 11 and closes its first-level contacts 9 and 10. Since there are similar arrangements of storage relay contacts associated with each pair of higher-level code reader contacts of the motorized reader, as shown by way of example for second-level contacts 1—3 of the storage relay RCS2, it will be appreciated that the coincidence circuit will maintain at least one continuous electrical circuit between its conductors 19 and 20 unless the code read by the motor reader is precisely the same as that identified by the address storage relays selected by operation of the switches S11 and unless as a further condition an 8 level code is read to open the 8th level code reader contacts 7 and 8. It will be recalled that an address is always identified by the use of an 8th level code bit, and it is for this reason that the coincidence circuit must find an 8th level code bit as well as coincidence between identity of the address storage relay contact settings and the code reader contact positioning before coincidence of the address established by the address storage relays and that read by the code reader is established.

As soon as the motor search relay MRS is energized in the manner just explained, it establishes a hold circuit for itself through the coincidence circuit 18 at the 180° code reading position of the motor reader cam-actuated contacts SRC2 or through the latter contacts at the non-code reading position of the reader, and through the now closed contacts 27 and 28 of the search relay MRS, the motor reader tight tape contacts MSTT, the code reader tape contacts MSRT, the now closed contacts 23 and 24 of the motor search relay MRS, the normally closed contacts of the motor stop read switch S2, and the normally closed contacts of the printer stop read switch S3. The now closed contacts 25 and 26 of the motor search relay MRS also establish an energizing circuit for the motor reader control relay MRRC around the stop code 1—2—4 contacts of the motor reader contact bank 16 so that the motor reader control relay MRRC is not de-energized during a search operation by reason of the reading of a stop code by the motor reader.

Now when the motor search switch S12 is manually released to close its contacts S12a, the motor reader clutch magnet MRC is energized to place the motor reader in operation; this energizing circuit includes the cam actuated motor reader contacts SRC1 which open at 20° and close at 225° of each motor reader cycle, the now closed contacts 7 and 8 of the read control relay MRRC, the now closed contacts 2 and 3 of the motor search relay MRS, the normally closed contacts 21 and 22 of the relay RCD1, the normally closed contacts 3 and 4 of the relay RAS, and the normally closed contacts of the switches S12, S2 and S3. Since this energizing circuit is effective continuously to energize the motor reader through successive cycles of reading operation (and independently of the printer cam-actuated contacts STC1) so long as the motor search relay MRS remains energized, the search proceeds independently and at a relatively high reading rate. As soon as the motor reader reads an address corresponding to that stored in the address storage relays RCS1, RCS2, etc., the electrical continuity of the coincidence circuit 18 is interrupted to de-energize the motor search relay MRS. This halts the search operation of the motor reader and conditions it to read out the next information item or block of information in a manner now to be explained.

As soon as the motor search relay MRS becomes de-energized as last mentioned, its contacts 21 and 22 close and the relays RCD1 and RCD2 (FIG. 2g) are energized in the manner previously explained. The motor tape reader is now conditioned to effect automatic control of the printer operations in the manner previously described. The motor reader clutch magnet MRC is energized at this time through a circuit which includes both the cam actuated contacts SRC1 of the motor reader and the cam actuated contacts STC1 of the printer, which open at 15° and close at 250° of each printer cycle. Thus while the motor reader reads at a high reading rate during search operations since the reader clutch energizing circuit does not include the cam actuated contacts STC1 of the printer, it is so controlled by the printer cam actuated contacts STC1 during data read out to the printer in the manner above described that the motor reader rate is now reduced to that of the printer. Accordingly the motor reader reading rate is much lower as long as the motor reader is reading data information out to the printer for reproduction. This holds true also during manual and automatic non-print operations of the printer where the latter continues to operate through successive cycles although effecting no printing of data information, thus insuring that the motor tape reader is maintained at a lower reading rate consistent with the recording of information at such lower rate in a by-product tape punch when selected.

The read out of data information from the motor tape reader continues until the read reads either a stop code 1—2—4 or an address identity code 13457 which requests a further automatic search for information. A stop code 1—2—4 when now read by the motor reader contact bank 16 is effective to interrupt the hold circuit of the motor read control relay MRCR since this circuit is no longer bypassed around the motor reader contacts by the now open contacts 23 and 24 of the motor search relay MRS. If the motor read control relay MRRC is so de-energized, its contacts 7 and 8 open to interrupt the energizing circuit of the motor reader clutch magnet MRC and thereby terminate operation of the motor reader. If on the other hand the motor reader bank of contacts 19 should read an address identity code 13457, the motor search relay MRS is again energized through the coincidence circuit 18, the now closed contacts 2 and 3 of the motor read control relay MRRC, the address identity contacts of the contact bank 19, normally closed contacts 1 and 2 of the skip relay RS, normally closed contacts 21 and 22 of the manual non-print control relay RMNP, and the normally closed contacts 23 and 24 of the automatic non-print relay RANP. This re-energization of the motor search relay MRS will initiate a new search to locate data at an address corresponding to that stored in the address storage relays RCS1, RCS2, etc. This new search operation and the subsequent read out of data information following location of the information addressed will proceed in the manner just described. It will accordingly be apparent that where a data information item or block of information is terminated by an address identity code, all recorded information of the same address may be collated and read out to the printer by successive repeat search operations automatically performed. It should also be noted that the address of the information for which a repeat search is desired may be changed at any time by manual re-positioning of the address identity switches S11.

A repeat search thus initiated will continue until a data information item or block of information is terminated by a stop code 1—2—4 to halt the search as above explained or until the motor stop switch S2 is actuated to de-energize the hold circuit of the motor read control relay MRRC by opening the contacts S2a of the switch S2. This actuation of the motor stop switch S2 will also halt a search in progress by de-energizing the motor search relay MRS as well as the read control relay MRRC, the relays RCD1 and RCD2 if energized at this time nevertheless being temporarily maintained energized (to complete the read out of a data item to the printer) until the motor stop switch S2 is manually released. This energizing circuit for the latter relays includes the now closed contacts 2 and 3 of the relay RCD1, a diode rectifier CR1, the manually closed contacts S2b of the switch S2, and the normally closed contacts of the switch S3.

During the progress of a search operation by the motor reader, any functional control codes read by the motor reader contact bank 19 are ignored since the energization of this reader bank is interrupted by the normally open contacts 7 and 8 of the relay RCD1 which is de-energized during a search operation.

It was assumed during the preceding explanation of the search operation that it was initiated at a time when the switch relay SW had been left with its contacts latched up in a transferred position (i.e., that the relay winding MRS had been energized later in point of time than the unlatch relay winding PRS). Consider now the changed mode of search operation which results when the switch relay SW has its contacts in the unlatched position (the relay winding PRS last energized) at the time the motor search switch S12 is manually actuated. The search operation proceeds as above described by energization of the search relay MRS and control relay MRRC, but now when coincidence of addresses de-energizes the search relay MRS the control relay MRRC is also de-energized since its hold circuit is interrupted by the now open contacts 23 and 24 of the search relay MRS and by the normally open contacts 22R and 23R of the switch relay SW. With the control relay MRRC thus de-energized, the motor reader operation is halted since the reader clutch magnet MRC energization is interrupted by the normally open contacts 7 and 8 of the control relay MRRC. The motor reader having thus completed the search, and standing in readiness to read out data information having the address sought, awaits further control to effect such read out.

3. DUPLEX OPERATION-SYSTEM OPERATION UNDER ALTERNATE CONTROL OF THE PRINTER TAPE READER AND THE MOTOR TAPE READER

Data information may be alternately supplied, automatically under program control, from both the printer tape reader and motor tape reader. This mode of operation also provides an additional mode of search operation by the motor tape reader. These new and different modes of operation will now be considered.

(a) *Duplex operation.*—The system includes a manually actuable duplex switch S13 which may be manually actuated to switch-open or switch-closed positions and which remains in the position to which it is manually set. When manually closed, a switch code 2—3—4 read by the printer tape reader contact bank 14 effects energization of the switch relay winding MRS and of the motorized reader read control relay MRRC in the same manner as manual actuation of the motor start read switch S5. This transfers the reading operation from the printer tape reader to the motor tape reader. A switch code 2—3—4 now read by the motor reader contact bank 19 energizes the switch relay winding PRS and the print reader control relay PRRC in the same manner as manual actuation of the start read switch S1, thus terminating reading by the motor reader and initiating reading by the printer tape reader. Accordingly a switch code read by either reader transfers the reading operation to the other until such time as the other reader itself reads a switch code to return reading to the first reader. Since the reader contact banks 14 and 19 are energized through the normally closed contacts 1 and 2 of the skip relay RS, the contacts 21 and 22 of the manual non-print relay RMNP, and the contacts 23 and 24 of the automatic non-print relay RANP, it is apparent that a switch code 2—3—4 read during either form of non-print operation or during a skip operation is ignored by the system and does not effect transfer of reading to the other reader. The operation of either reader when operating is otherwise, however, that heretofore described.

(b) *Data information search initiated by the printer tape reader.*—When the duplex switch 13 is manually actuated to closed position, it becomes possible for the printer tape reader to initiate an information search by the motor tape reader. Having initiated the search, the printer tape reader may continue reading data information to the printer or by-product tape punch and the motor tape reader concurrently performs its search operation independently. If the motor tape reader completes its search before a switch code 2—3—4 is read by the printer tape reader, the motor reader operation halts in readiness to read the addressed data information; it proceeds to do so when a switch code read by the printer tape reader transfers the read operation to the motor reader. If the switch code is read prior to the time the motor reader has completed its search operation, all reading halts until the search operation is finished whereupon the motor reader immediately begins to read data information out to the printer and by-product tape punch. The precise manner in which these several operations occur will be evident from the foregoing description of search operations by the motor tape reader and of the duplex mode of operation by which reading is transferred between the motor tape reader and the printer tape reader.

When the printer tape reader initiates a search by the motor reader, it normally furnishes the address identity of the data which is the subject of the search. In doing this, the printer tape reader contact bank 14 will read an AID (address identification) code 13457 which thereupon energizes relay RAC1. The contacts 4 and 5 of the latter relay now close to pick up relay RAC2, the relay RAC1 being held through its normally open contacts 26 and 27, the normally closed contacts 23 and 24 of relay RAC2, the normally closed contacts 4 and 5 of the motor reader control relay MRRC, and the normally closed contacts of the motor stop switch S2 and print reader stop switch S3. Thus as soon as the relay RAC2 picks up, its contacts 23 and 24 open to de-energize the hold circuit last described for the relay RAC1, the relay RAC2 now holding through its normally open contacts 24 and 25 and the hold circuit last mentioned. The normally open contacts 4 and 5 of the relay RAC2 now close to pick up an auto select relay RAS through the now closed contacts 3 and 4 of the relay RAC1 from the energizing circuit last mentioned. The relay RAS holds through its now closed contacts 1 and 2 and the contacts 3 and 4 of the printer reader common contact PSRC until the end of each printer cycle, the relay RAS otherwise holding through its pick up circuit first described.

The next code read by the printer tape reader is an address code of the information to be located by the search, and the printer reader contacts PSR1 (together with other higher level code contacts not shown) energize the storage relays RCS1 through the normally open contacts 6 and 7 of the relay RAS (there being a higher code-level storage relay and a corresponding pair of contacts of the relay RAS associated with each higher level reader contact of the reader) thus storing the address of the data to be located. Preparatory to storing this address, it will be noted that the normally closed contacts 6 and 7 of the relay RAC1 open to de-energize the holding circuit of any storage relays RCS1 previously energized and previously held through the normally open contacts 4 and 5 of each such storage relay RCS1 and the normally closed contacts 6 and 7 of the relay RAC1. Thus the energization of the relay RAC1 serves to erase any address previously stored in the storage relays RCS1 and prepare the latter to store the new address read from the printer tape reader. Also in preparation for this operation, all of the manual address select switches S4 are manually moved to close their normally closed contacts 1 and 2. In thus storing the address in the storage relays RCS1, it may be noted that the normally open contacts 26 and 27 of the relay RAC2 are now closed and accordingly energize the 8-level translator magnet of the printer. Such energization prevents selection of all printer key levers except the carriage return key lever, but selection of the latter at this time is prevented by the fact that the address includes code bits which energize translator magnets and thereby prevent carriage return key lever selection. This translator energization thus causes the address read by the printer tape reader to be ignored by and effect no operation of the printer.

The address of the data desired having thus been stored in the storage relays RCS1, the next printer cycle effects closure of the contacts 3 and 4 of the reader common contact PSRC to energize the motor search relay MRS through the now closed contacts 1 and 2 of the relay RAS, the now closed contacts 28 and 29 of the relay RAC2, and the cam actuated contacts SRC2 of the motor reader (now closed since the motor reader is quiescent). As previously explained, the normally open contacts 23 and 24, 27—28, and 25—26 of the search relay MRS complete a hold circuit for this relay and establish an energizing circuit for the motor reader control relay MRRC. The normally closed contacts 4 and 5 of the latter relay now open to interrupt the energizing circuit of the relay RAC2, and the contacts 28 and 29 of the latter open to interrupt the hold circuit of the auto select relay RAS. The motor reader clutch MRC is now energized through its high speed reader energizing circuit which includes the cam actuated contacts SRC1 of the motor reader, the now closed contacts 7 and 8 of the reader control relay MRRC, the now closed contacts 2 and 3 of the search relay MRS, the now closed contacts 21 and 22 of the relay RCD1, the now closed contacts 3 and 4 of the relay RAS, and the manually actuable switches S12, S2, and S3.

The motor tape reader now begins its search at high reading rate and the search is terminated as above described when identity of addresses is found. Since the motor search is terminated by de-energization of both the search relay MRS and control relay MRRC for reasons previously mentioned, the motor tape reader halts awaiting the reading of a switch code 2—3—4 by the printer tape reader to cause the motor reader to read out the data information located by the search. Each information item or block of information so read out is normally terminated by a switch code 2—3—4 to effect return of the reading operation back to the printer tape reader. However should the information read out be terminated by an address identification code, rather than a switch code, repeat searching ensues for all information having the address stored in the address storage relays RCS1 and the last of such information can be terminated by a stop code or a switch code as desired.

MANUAL DATA SELECTOR

FIGS. 3a–3h arranged as indicated in FIG. 3 show the electrical circuit arrangement of the manual data insertion unit which may be used with the data translation system just described.

It will be noted from FIG. 3 that the data insertion unit includes plug connectors JD1—JD9 and JD11—JD16. The plug JD1 is connected to the receptacle JD1 shown in FIG. 2g by which energization of the plug JD1 in a manner presently to be described is effective to energize the first level translator magnet T1 of the printer or the first level punch magnet T1 of the by-product tape punch in a manner similar to that previously described. The plugs JD2—JD8 similarly are connected to respective ones of the second level through 8th level translator magnets and punch magnets which as previously explained are not here shown for simplicity. The plug JD9 is connected to the receptacle JD9 which energizes the translator clutch of the printer and the punch clutch of the by-product tape punch in a manner similar to that previously described, and the plugs JD11 and JD16 are connected to respective receptacles JD11 and JD16 of the translating system for purposes of providing energizing unidirectional potential to the manual data insertion unit. The plugs JD13 and JD14 are connected to respective receptacles JD13 and JD14 of the translation system, and the conductor 10 of the latter is removed from its position between the terminals 11 and 12 so that the circuit through the manual data insertion unit between the plugs JD13 and JD14 now controls the energizations of the motor reader clutch magnet MRC and the printer tape reader clutch magnet PRC. The plug JD12 of the data insertion unit is connected to the receptacle JD12 of the translation system to be energized by a data select code 12345 read by either the printer tape reader contact bank 14 or the motorized reader contact bank 19. The plug JD15 of the data insertion unit is connected to the receptacle JD15 of the translation system for energization by the printer cam-actuated contacts STC2 which closes at 340° of one printer cycle and open at 180° of the next printer cycle.

The data insertion unit includes a relay DS which is energized through the plug receptacle JD12 upon reading a data select code at either the printer tape reader or the motorized tape reader. The relay DS establishes a hold circuit for itself through its contacts 2 and 3 and the normally closed contacts 1 and 2 of an OFF-Normal switch S15. The latter is positioned in OFF position whenever a stepping switch, having contact banks B–1 and B–2, is in home position but is moved to Normal position whenever the stepping switch is in process of stepping from its contact T1 through its contact T10 and back to its home position. A manually positionable switch S16 may be moved to close its contacts 1 and 2 and thereby energize a magnet DC1 concurrently with energization of the magnet DS. The magnet DC1 completes a hold circuit for itself through its contacts 2 and 3 and the normally open contacts 2 and 3 of the Off-Normal switch S15. The alternative positioning of the switch S16 to close its contacts 1 and 3 causes the relay DC1 to be energized through the normally open contacts 5 and 6 of the relay DS after the latter has picked up and by further energization of the plug receptacle JD6 by reading an appropriate code bit by the reader which read the data select code. A relay DC2 is similarly energized through the normally open contacts 7 and 8 of the relay DS upon energization of the plug receptacle JD7 by reading an appropriate code bit by the tape reader which read the data select code.

In summary of the relay energizations last described, the relay DS is always energized upon reading a data select code and the positioning of the switch S16 to close its contacts 1 and 2 may also effect concurrent energization of the relay DC1 which in this event is maintained energized by two hold circuits. One of these includes the contacts 2 and 3 of the relay DC1 and the normally open contacts 2 and 3 of the switch 15, and the other includes the normally open contacts 22 and 23 of the relay DC1 and the normally open contacts 26 and 27 of the relay DS. Thus concurrent energization of the relays DS and DC1 insures that the relay DS shall remain energized, and thereby maintain the relay DC1 likewise energized, until the OFF-Normal switch S15 transfers its contacts at the initiation of a stepping operation by the stepping switch B—1, B—2. Thereafter the relay DS is de-energized but the relay DC1 remains energized through its contacts 2 and 3 and the now closed contacts 2 and 3 of the OFF-Normal switch S15. In the alternative form of relay energization where the switch S16 is manually moved to close its contacts 1 and 3, the relay DS is energized as before by the reading of a data select code and its now closed contacts 5 and 6 enable the energization of the relay DC1 if the next code read is one having a code bit effective to energize the plug receptacle JD6; alternatively the now closed contacts 7 and 8 of the relay DS enable energization of the relay DC2 if the code following the data select code is one which is effective to energize the plug receptacle JD7. As with the relay DC1, the relay DC2 when energized establishes a hold circuit through its contacts 2 and 3 and the contacts 2 and 3 of the OFF-Normal switch S15 when closed upon initiation of a stepping switch operation or in the alternative establishes a hold circuit through its contacts 22 and 23 and the now closed contacts 26 and 27 of the relay DS in energized state.

Whenever either of the relays DC1 or DC2 is energized, their respective contacts 4 and 5 interrupt the circuit through the data select unit between plug receptacles JD13 and JD14, and it will be apparent from FIG. 2 that interruption of this circuit is effective to halt both tape readers by interruption of the energizing circuits for the motor reader clutch magnet MRC and printer reader clutch magnet PRC. This occurs upon the reading of the data select code if the switch S16 is manually positioned to close its contacts 1 and 2 and thus effect immediate energization of the relay DC1, or otherwise occurs when the code following the data select code effects energization of either the relay DC1 or DC2. However, at the time the relay DC1 or DC2 is so energized the printer cam-actuated contacts STC2 are closed and the plug-receptacle JD15 is energized. This energization is applied through the now closed contacts 24 and 25 of the relay DS and through the plug-receptacle JD8 to energize the 8-level translator magnet thus to prevent selection of any printer key lever by the code which effected the energization of the relay DC1 or DC2. The energized plug-receptacle JD15 also energizes a stepping magnet LS of the stepping switch through the now closed contacts 22 and 23 of the relay DS and either the closed contacts 7 and 8 of the relay DC1 or the closed contacts 7 and 8 of the relay DC2. As the printer completes its cycle of operation and its cam-actuated contacts STC2 open, the stepping magnet LS is deenergized and causes the stepping switch segments B–1 and B–2 to step to their first segment T1. For the particular connections shown in FIG. 3, the contact T1 of the stepping switch segment B–1 is energized through the contacts 24 and 25 of the relay DC1 if energized and the normally closed contacts 21 and 22 of the relay DS which now becomes de-energized by movement of the switch S15 to its normal position; likewise the contact T1 of the stepping switch segment B–2 is energized through the contacts 24 and 25 of the relay DC2 if energized and the normally closed contacts 21 and 22 of the relay DS.

FIG. 3 shows all ten contacts T1—T10 of the stepping switch segment B–1 connected to individual ones of a plurality of switches SS1–SS10. These switches are manually adjustable to any of 11 positions of which the first nine are identified by the numerals 1 through 9 and the last two are identified by the numeral zero and the letter S. These contacts of all the switches SS1—SS10 are so connected in common through rectifiers CR1—CR18 that the contacts 1 through 9 energize the plugs JD1—JD4 in accordance with the binary value of the decimal digits 1–9 manually selected, the plug JD5 being also energized as necessary to maintain odd parity by creating at the plug JD5 a parity redundant bit which may be used for parity checking purposes as explained more fully in the aforementioned Blodgett et al. Patent No. 2,905,298. The zero contacts of the switches SS1—SS10 are all connected directly to the plug JD6. The S contact of the switches SS1—SS10 may have any of three alternate connections as desired for a particular application:

(1) This contact of each switch may be connected by a conductor 21 to complete an electrical circuit between terminals 22 and 23 whereby the contact S of the switches SS1—SS10 energizes the plug JD5 and thus will merely space the printer carriage;

(2) The terminals 22 and 24 may be connected as indicated by the broken line conductor 25 (the conductor 21 being removed) whereby the contact S of the switches SS1—SS10 energizes the plug JD7 thus establishing an information code group corresponding to a "dash" symbol; or (3) The terminal 22 may be connected as indicated by the broken line conductor 26 to a terminal 27 whereby the contact S of the switches SS1—SS10 energizes through the diode rectifiers CR16—CR18 the plugs JD1, JD5 and JD6 thus generating an information code group corresponding to a "diagonal" symbol.

For the particular connections shown in FIG. 3, whereby the stepping switch contacts T1–T10 of the segment B–1 are connected to individual ones of the manually settable switches SS1—SS10, selection of the relay DC1 effects read out of 10 data items in succession beginning with switch SS1 and ending with switch SS10. In this, the energization of the plug JD15 by the printer cam-actuated contacts STC2 near the end of each printer cycle is applied through the contacts 24 and 25 of the relay DS or the contacts 21 and 25 of the relay DS and either the contacts 26 and 27 of the relay DC1 or the contacts 26 and 27 of the relay DC2 to energize the plug-receptacle JD9 and thus initiate a new cycle of printer operation by energizing the printer translator clutch magnet TC. The successive energizations of the plug-receptacle JD15 thus effected are applied directly through the now closed contacts 4 and 5 of the OFF-Normal switch S15 to the stepping magnet LS whereby the stepping switch is always stepped through ten steps and returns to its home position. The switch S15 is thereupon transferred to its OFF position to interrupt the hold circuit through its contacts 2 and 3 of the relay DC1 or DC2. The reader clutch circuit through the plug-receptacle JD13–JD14 is again completed, and operation of the tape reader resumes after this read out of a maximum of ten data items from the manual data insertion unit.

The provision of two stepping switch segments B–1 and B–2 enables the selection of two groups of manually insertable data, the total number of data items in the two groups being 10 but otherwise the number in either group being selectable by connection of a group of the contacts T1—T10 of the segment B–1 to a corresponding group of the switches SS1—SS10 and by a connection of the group of contacts T1–T10 of the switch segment B–2 which correspond to the unused contacts of the segment B–1 to the remaining ones of the switches SS1—SS10 which are not connected to the contacts of the segment B–1. With this connection of the stepping switch segments B–1 and B–2 with the manually settable switches SS1—SS10, selection of the relay DC1 or DC2 in the manner above explained effects read out to the printer of the corresponding group of information items manually insertable by positioning of the switches SS1–SS10.

While a specific form of invention has been described for purposes of illustration, it is contemplated that numerous changes may be made without departing from the spirit of the invention.

What is claimed is:

1. A data translation system comprising data utilizing means, means for reading a unitary record medium to derive and make available for utilization by said utilizing means data recorded in said medium, plural quantities of recorded data being each identifiable by an individual address recorded with the data in said medium and repetitively recorded identical addresses identifying in said medium data of a related character, address-storage means for storing any selected one of said individual addresses, means for conditioning said reading means to conduct search reading operations during which said reading means is caused to read said medium at a relatively high reading rate and independently of the data recorded therein until there is derived from said medium an address identical to that stored in said address-storage means, means responsive to an address identity condition for causing further derived data to be made available for use by said utilizing means and the reading rate of said reading means to be controlled by said utilizing means at the rate of utilization of said derived data thereby, and means responsive to search address data read from said medium during the operation of said reading means at said controlled reading rate for effecting a renewed address searching operation at said high reading rate and again proceeding independently of said utilizing means until said identity of addresses again prevails.

2. A data translation system comprising data utilizing means, means for reading a unitary record medium to derive and make available for utilization data recorded in said medium, plural quantities of recorded data being each identifiable by an individual address recorded with the data in said medium and repetitively recorded identical addresses identifying in said medium data of a related character, address-storage means for storing any selected one of said individual addresses, first control means for causing said reading means to conduct search reading operations during which said reading means is caused to read said medium at a normal reading rate and independently of the data recorded therein until there is derived from said medium an address identical to that stored in said address-storage means, second control means responsive to an address identity condition for causing further derived data to be made available for use by said utilizing means and the further reading rate of said reading means to be controlled by said utilizing means at the rate of utilization of said derived data thereby, and means responsive to each occurrence of a preselected data item derived from said medium while said reading means is reading at said controlled reading rate for causing said first control means to initiate a further said search reading operation by said reading means at said normal reading rate until said address identity condition prevails and for thereupon causing said second control means again to make said derived data available for utilization by said utilizing means and again to control the reading rate of said reading means at said rate of utilization.

3. A data translation system comprising cyclically operated data utilizing means; cyclically operated means for reading a record medium to derive and make available for utilization data recorded in said medium, plural quantities of recorded data having identifiable individual addresses recorded therewith and by use of an address form having at least one characteristic which distinguishes each address recorded in said medium from data recorded therein; address-storage means; manual selection means for manually selecting any of said individual addresses; means for effecting concurrent storage in said address storage means of each address manually selected and initiation of an address searching operation of said reading means which upon initiation proceeds at a first cyclic reading rate, is independent of data recorded in said medium, which does not make data available for utilization, and which is terminated when an address is read from said medium identical to that in said address-storage means; and means responsive to each said termination of an address searching operation for conditioning said reading means to read at a second cyclic reading rate differing from said first rate and controlled by the cyclic rate of said utilizing means and to make said derived data available for utilization by said utilizing means.

4. A data translation system comprising means for reading a record medium to derive and make available for utilization data recorded in said medium, plural quantities of recorded data being each identifiable by an individual address recorded with the data in said medium, address-storage means for storing any selected one of said individual addresses, control means for causing said reading means to conduct search reading operations which terminate further availability of derived data for utilization until there is derived from said medium an address identical to that stored in said address-storage means, means responsive to an address identity condition for causing the further reading rate of said reading means to be controlled by the rate of utilization of said derived data, means responsive to first preselected data derived at said controlled reading rate for causing said control means to initiate a further search reading operation of said reading means, means responsive to second preselected data derived at said controlled reading rate for terminating operation of said reading means, and means activated by third preselected data and deactivated by fourth preselected data derived at said controlled reading rate for nullifying while activated the control effect of said first and second preselected data on the operations of said reading means.

5. A data translation system comprising cyclically operated data utilizing means, cyclically operated means for reading a record medium to derive and supply to said utilizing means address-identifiable data recorded in said medium, address-storage means for storing the address of data desired to be read from said medium, and means for effecting address searching operations of said reading means at a cyclic rate of operation independent of said utilizing means and without the supply of derived data thereto but responsive to the identity of an address read from said medium with that in said address storage means for transferring control of the continued cyclic reading operation of said reading means to said utilizing means and for making derived data available for utilization thereby.

6. A data translation system comprising data utilizing means having a cyclic operation at a preselected maximum rate of data utilization, cyclically operated means for reading a record medium to derive and supply to said utilizing means address-identifiable data recorded in said medium, address-storage means for storing the address of data desired to be read from said medium, and means for effecting address searching operations of said reading means at a reading rate substantially higher than said utilization rate and independently of said utilizing means but responsive to the identity of an address read from said medium with that in said address storage means for transferring control of the continued cyclic reading operation of said reading means to said utilizing means to effect reading operations at a lower reading rate corresponding to said utilizing rate of said utilizing means and for making derived data available for utilization thereby.

7. A data translation system comprising cyclically operated data utilizing means, cyclically operated means for reading a record medium to derive and supply to said utilizing means address-identifiable data recorded in said medium, address-storage means for storing an address manually selected of data desired to be read from said medium, and means for manually initiating and thereafter automatically continuing address searching operations of said reading means at a cyclic rate of operation independent of said utilizing means and without the supply of derived data thereto but responsive to the identity of an address read from said medium with that in said address storage means for transferring control of the continued cycle reading operation of said reading means to said utilizing means and for making derived data available for utilization thereby.

8. A data translation system comprising cyclically operated data utilizing means, cyclically operated means for reading a record medium to derive and supply to said utilizing means address-identifiable data recorded in said medium, address-storage means for storing the address of data desired to be read from said medium, means for effecting address searching operations of said reading means at a cyclic rate of operation independent of said utilizing means and without the supply of derived data thereto but responsive to the identity of an address read from said medium with that in said address storage means for transferring control of the continued cyclic reading operation of said reading means to said utilizing means and for making derived data available for utilization thereby, and means responsive to preselected data read from said medium during said continued operation for effecting an automatically renewed address searching operation which again proceeds independently of said utilizing means until said identity of addresses again prevails and is followed by automatic return of control of said reading rate to said utilizing means and automatic restoration of availability of derived data for use thereby.

9. A data translation system comprising data utilizing means having a cyclic operation of preselected first cyclic period, means having a cyclic operation of a second appreciably shorter period than said first period for reading a record medium to derive and supply to said utilizing means address identifiable data recorded in said medium, address-storage means for storing the address of data desired to be read from said medium, and means for effecting address searching operations of said reading means operating at said second period and independently of said utilizing means and without the supply of derived data thereto but responsive to the identity of an address read from said medium with that in said address storage means for automatically transferring control of the continued cyclic reading operation of said reading means to said utilizing means to effect said supply of data to said utilizing means at the cyclic period thereof.

10. A data translation system comprising data utilizing means, cyclically operated means for reading a record medium to derive and supply to said utilizing means data recorded in said medium, plural quantities of recorded data being each identifiable by an individual address recorded with the data in said medium, address-storage means for storing any selected one of said individual addresses, and means for effecting address searching operations of said reading means at a cyclic rate independent of said utilizing means but responsive to the identity of an address read from said medium with that in said address-storage means for transferring control of the continued cyclic operation of said reading means to said utilizing means.

11. A data translation system comprising data utilizing means, means for reading a record medium to derive and supply to said utilizing means data recorded in said medium, plural quantities of recorded data being each identifiable by an individual address which is recorded with the data in said medium but which when supplied to said utilizing means is not utilized thereby, address-storage means for storing any selected one of said individual addresses, means for effecting supply of said derived data to said utilizing means at a first reading rate of said reading means which is controlled by said utilizing means, and means responsive to initiation of each address searching operation of said reading means for continuing said each search operation at a second reading rate and independently of said utilizing means until an address is read from said medium that is identical with that in said address-storage means.

12. A data translation system comprising cyclically operating data utilizing means, cyclically operating means for reading a record medium to derive and supply to said utilizing means data recorded in said medium, plural quantities of recorded data being each identifiable by an individual address which is recorded with the data in said medium but which when supplied to said utilizing means is not utilized thereby, address-storage means for storing any selected one of said individual addresses, means for effecting supply of said derived data from said reading means to said utilizing means at a cyclic rate controlled by said utilizing means, and means responsive to initiation of each address searching operation of said reading means for continuing said each search operation at the cyclic rate of said reading means and independently of said utilizing means until an address is read from said medium that is identical with an address stored in said address-storage means.

13. A data translation system comprising data utilizing means, means for reading a record medium to derive and supply to said utilizing means data recorded in said medium, plural quantities of recorded data being each identifiable by an individual address recorded with the data in said medium, address-storage means for storing any selected one of said individual addresses, means for effecting search reading operations of said reading means which proceed independently of said utilizing means until there is derived from said medium an address identical to that stored in said address-storage means, means responsive to an address identity condition for causing said reading means to supply said derived data to said utilizing means at a reading rate controlled by said utilizing means, and means responsive to a preselected code read from said medium for interrupting said supply of data to said utilizing means and for initiating a further search reading operation of said reading means independently of said utilizing means.

14. A data translation system comprising cyclically operating data utilizing means, cyclically operating means for reading a record medium to derive and supply to said utilizing means data recorded in said medium, plural quantities of recorded data being each identifiable by an individual address recorded with the data in said medium, address-storage means for storing any selected one of said individual addresses, means for effecting search reading operations of said reading means which proceed independently of said utilizing means until there is derived from said medium an address identical to that stored in said address-storage means, means responsive to an address identity condition for causing said reading means to supply said derived data to said utilizing means, means operative during said supply of data to said utilizing means for causing the substantial completion of a cycle of operation of said utilizing means to initiate a new cycle of operation of said reading means and for causing each cycle of operation of said reading means to initiate a new cycle of operation of said utilizing means, and means responsive to stop-control data read from said medium for halting the operation of said reading means and thereby the operation of said utilizing means.

15. A data translation system comprising cyclically operating data utilizing means, cyclically operating means for reading a record medium to derive and supply to said utilizing means data recorded in said medium, plural quantities of recorded data being each identifiable by an individual address recorded with the data in said medium, address-storage means for storing any selected one of said individual addresses, means for effecting search reading operations of said reading means which proceed without interruption by stop-control data read from said medium and independently of said utilizing means until there is derived from said medium an address identical to that stored in said address-storage means, means responsive to an address identity condition for causing said reading means to supply said derived data to said utilizing means, means operative during said supply of data to said utilizing means for causing the substantial completion of a cycle of operation of said utilizing means to initiate a new cycle of operation of said reading means and for causing each cycle of operation of said reading means to initiate a new cycle of operation of said utilizing means, and means responsive to stop-control data read from said medium during said supply of data to said utilizing means for halting the operation of said reading means and thereby the operation of said utilizing means.

16. A data translation system comprising data printing means, means for reading a record medium to derive address-identifiable data recorded in said medium, address-storage means for storing the address of data desired to be read from said medium, means for effecting record medium programmed automatic address searching operations of said reading means to locate in said medium an address corresponding to that in said address-storage means, means operative during non-searching operations of said reading means for effecting supply of said derived data to said printing means for printed reproduction thereof, means for suppressing printing of said data by said printing means, and means responsive to said print suppression for suppressing said programmed automatic address searching operations of said reading means.

17. A data translation system comprising data printing means, means for reading a record medium to derive address-identifiable data recorded in said medium, address-storage means for storing the address of data desired to be read from said medium, means for effecting record medium programmed automatic address searching operations of said reading means to locate in said medium an address corresponding to that in said address-storage means, means operative during non-searching operations of said reading means for effecting supply of said derived data to said printing means for printed reproduction thereof and for effecting record-medium-programmed halts of said printing means, means responsive to record medium programmed print suppression for suppressing printing of said data by said printing means, and means responsive to said print suppression for suppressing both record medium programmed halts of said reading means and said programmed automatic address searching operations thereof.

18. A data translation system comprising data printing means, data recording means, means for reading a record medium to derive address-identifiable data recorded in said medium, address-storage means for storing the address of data desired to be read from said medium, means for effecting record medium programmed automatic address searching operations of said reading means to locate in said medium an address corresponding to that in said address-storage means, means operative during non-searching operations of said reading means for effecting under record medium programmed control the supply of said derived data selectively to said printing means and to said recording means to effect selective print reproduction and selective re-recording thereof, and means responsive to non-reproduction of said derived data by said printing means for suppressing said programmed automatic address searching operations of said reading means.

19. A data translation system comprising data printing means, data recording means, means for reading a record medium to derive and supply to said printing means and recording means address-identifiable data recorded in said medium, address-storage means for storing the address of data desired to be read from said medium, means for effecting address searching operations of said reading means without interruption by any data read from said medium other than address data and independently of said printing and recording means but responsive to the identity of an address read from said medium with that in said address-storage means for transferring control of the continued operation of said reading means to said printing means while supplying said derived data to said printing means for reproduction thereof and to said recording means for re-recording thereof, means for initiating and terminating the suppression of reproduction of said data by said printing means while continuing the re-recording thereof by said recording means, and means responsive to said suppression of reproduction for inhibiting address searching operations of said reading means.

20. A data translation system comprising data printing means, data recording means, means for reading a record medium to derive and supply to said printing and recording means address-identifiable data recorded in said medium, address-storage means for storing the address of data desired to be read from said medium, means responsive to preselected data read from said medium for initiating address searching operations of said reading means which thereupon continue independently of said utilizing and recording means until an address is read from said medium that is identical with that in said address-storage means, means responsive to said address identity condition for supplying further data derived by said reading means to said printing and recording means for printed reproduction and re-recording thereof, means responsive to non-print derived data supplied to said printing means for suppressing data reproduction thereby while continuing said data re-recording and responsive to a print-restore derived data code supplied to said printing means for terminating said suppression of data reproduction, and means operative during said suppression of data reproduction for suppressing said initiation of address searching operations of said reading means.

21. A data translation system comprising data utilizing means, means for reading a record medium to derive and supply to said utilizing means data recorded in said medium, plural quantities of recorded data being each identifiable by an individual address recorded with hte data in said medium, address-storage means for storing any selected one of said individual addresses, means responsive to search reading operations of said reading means for causing said reading means to operate independently of said utilizing means until there is derived from said medium an address identical to that stored in said address-storage means, and mean responsive to an address identity condition for causing further reading operations of said reading means to be effected at a rate controlled by said utilizing means.

22. A data translation system comprising data utilizing means having a cyclic operation, means having a cyclic operation of higher periodicity than said utilizing means for reading a record medium to derive and supply to said utilizing means address-identifiable data recorded in said medium, address-storage means for storing the address of data desired to be read from said medium, and means for effecting address searching operations of said reading means at said higher cyclic periodicity and independently of said utilizing means but responsive to the identity of an address read from said medium with that in said address-storage means for automatically effecting such further inter-controlled operations of said utilizing means and reading means that each initiates a new cycle of operation of the other to effect supply of data from said reading means to said utilizing means at the cyclic periodicity of said utilizing means.

23. A data translation system comprising means for reading a record medium to make available for utilization data recorded in said medium, plural quantities of recorded data having identifiable individual addresses recorded therewith, address-storage means for storing any selected one of said individual addresses, means for causing said reading means to conduct search reading operations during which derived data is rendered unavailable for utilization until there is derived from said medium an address identical to that stored in said address-storage means, means responsive to an address identity condition for causing further derived data to be made available for utilization and the reading rate of said reading means to be controlled by the rate of utilization of said derived data, means responsive to stop-control data derived at said controlled reading rate for terminating operation of said reading means, and manual means selectably actuable to two positions in one of which said reading means is caused to initiate a search reading operation and in the other of which said reading means is caused to supply said derived data at said controlled reading rate.

24. A data translation system comprising data utilizing means, first and second means each adapted to read an individual record medium and supply the recorded data thereof to said utilizing means, means responsive to preselected control data read by one of said reading means for causing the other of said reading means to locate in the record medium individual thereto data having an address supplied by said one reading means, and means responsive to read control data subsequently read by said one reading means for causing said other reading means to supply the addressed data to said utilizing means.

25. A data translation system comprising data utilizing means, first and second means each adapted to read an individual record medium and supply the recorded data thereof to said utilizing means, means responsive to preselected control data read by one of said reading means for causing the other of said reading means to locate in the record medium read thereby data having an address supplied by said one reading means from the record medium individual thereto, and means responsive to read control data subsequently read by said one reading means for causing said other reading means to supply the addressed data to said utilizing means.

26. A data translation system comprising data utilizing means, first and second means each adapted to read an individual record medium and supply the recorded data thereof to said utilizing means, means responsive to preselected search-control data read by one of said reading means for causing the other of said reading means to locate in the record medium individual thereto data having an address read and supplied by said one reading means, and means responsive to read-control data subsequently read by said one reading means for transferring the reading operation from said one to said other reading means to cause said other reading means to supply the addressed data to said utilizing means, said control data and each said address having such distinctive recorded forms as to cause said utilizing means to be non-responsive thereto.

27. A data translation system comprising first and second means each adapted to read an individual record medium to render the recorded data thereof available for utilization, means responsive to preselected control data read by one of said reading means for continuing the operation of said one reading means while causing the other of said reading means to effect a concurrent operational search to locate in the record medium individual thereto data having an address supplied by said one reading means, and means responsive to read-control data subsequently read by said one reading means for causing said other reading means to render the addressed data available for utilization.

28. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means to locate in the record medium individual thereto data having said address, and means responsive to read-control data subsequently read by said one reading means for causing said other reading means to supply the addressed data to said utilizing means.

29. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means to locate in the record medium individual thereto data having said address, means responsive to read-control data subsequently read by said one reading means for causing transfer of the reading operation to said other reading means to supply the addressed data to said utilizing means, and means responsive to read control data subsequently read by said other reading means during non-searching operations thereof for causing return of the reading operation to said one reading means.

30. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means to locate in the record medium individual thereto data having said address, means responsive to read-control data subsequently read by said one reading means for causing transfer of the reading operation to said other reading means to supply the addressed data to said utilizing means, and means responsive to each occurrence of search-control data read by said other reading means during non-search operations thereof for causing said other reading means to effect a further automatic search for data having said address and the supply of the addressed data to said utilizing means.

31. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means to locate in the record medium individual thereto data having said address, means responsive to read-control data read by either of said reading means during the reading thereby of data to said utilizing means for causing the other of said reading means to supply data to said utilizing means, and means responsive to each occurrence of search-control data read by said other reading means during non-searching operations thereof for causing said other reading means to effect a further automatic search for data having said address.

32. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means to locate in the record medium individual thereto data having said address, means responsive to read control data read by either of said reading means during the reading thereby of data to said utilizing means for causing the other of said reading means to supply data to said utilizing means, means responsive to each occurrence of search-control data read by said other reading means during non-searching operations thereof for causing said other reading means to effect a further automatic search for data having said address, and means responsive to stop-read control data read by either of said reading means during the active reading thereby of data to said utilizing means for halting the operation of said active reading means.

33. A data translation system comprising data utilizing means, first and second means each adapted to read an individual record medium and supply the recorded data thereof to said utilizing means, address-storage means, means responsive to an address read by one of said reading means for effecting both storage thereof in said address-storage means and an automatic search operation of the other of said reading means at a relatively high reading rate to locate in the record medium individual thereto data having said address, and means responsive to read control data subsequently read by said one reading means for causing said other reading means to supply the addresses data at a lower reading rate to said utilizing means.

34. A data translation system comprising data utilizing means, first and second means each adapted to read an individual record medium and supply the recorded data theory to said utilizing means, address-storage means, means responsive to an address read by one of said reading means for effecting both storage thereof in said address-storage means and an automatic search operation of the other of said reading means, independently of further control by said one reading means, to locatte in the record medium individual thereto data having said address, and means responsive to read control data subsequently read by said one reading means for causing said other reading means to supply the addressed data to said utilizing means.

35. A data translation system comprising data utilizing means, first and second means each adapted to read an individual record medium and supply the recorded data thereof to said utilizing means, address-storage means, means for effecting manual selection and insertion of an address in said address-storage means, means responsive to search-control data read by one of said reading means for effecting an automatic search operation of the other of said reading means to locate in the record medium individual thereto data having said stored address, and means responsive to read-control data subsequently read by said one reading means for causing said other reading means to supply the addressed data to said utilizing means.

36. A data translation system comprising data utilizing means, first and second means each adapted to read an individual record medium and supply the recorded data thereof to said utilizing means, address-storage means, means responsive to each address read by one of said reading means for effecting storage thereof in said address-storage means, means for effecting manual selection and insertion of an address in said address-storage means, means for effecting an automatic search operation of the other of said reading means to locate in the record medium individual thereto data having said address, and means responsive to read control data read by either of said reading means for causing the other of said reading means to supply data to said utilizing means.

37. A data translation system comprising: data utilizing means; first and second means each adapted to read an individual record medium and supply the recorded data thereof to said utilizing means, address-storage means; means responsive to each address read by one of said reading means for effecting storage thereof in said address-storage means; means for effecting manual selection and insertion of an address in said address-storage means; means for effecting an automatic search operation of the other of said reading means, which proceeds independently of and may proceed concurrently with the operation of said one reading means, to locate in the record medium individual thereto data having said address; and means responsive to read control data subsequently read by said one reading means for causing said other reading means to supply the addresser data to said utilizing means.

38. A data translation system comprising data utilizing means, first and second means each adapted to read an individual record medium and supply the recorded data thereof to said utilizing means, address-storage means, manual means for creating and holding in readiness for supply to said utilizing means a preselected amount of data, means responsive to an address read by one of said reading means for effecting both storage thereof in said address-storage means and an automatic search operation of the other of said reading means to locate in the record medium individual thereto data having said address, means responsive to read-control data read by either of said reading means for causing the other of said reading means to supply data to said utilizing means, and means responsive to data-insertion control data read by either of said reading means when active to supply data to said utilizing means for causing said manual means to supply said preselected amount of data to said utilizing means and while doing so to halt temporarily the operation of said active reading means.

39. A data translation system comprising data utilizing means, first and second means each adapted to read an individual record medium and supply the recorded data thereof to said utilizing means, address-storage means, manual means for creating and holding in readiness for supply to said utilizing means plural individually addressable quantities of data of preselectable amounts, means responsive to an address read by one of said reading means for effecting both storage thereof in said address-storage means and an automatic search operation of the other of said reading means to locate in the record medium individual thereto data having said address, means responsive to read-control data read by either of said reading means for causing the other of said reading means to supply data to said utilizing means, and means responsive to data-insertion control data and accompanying data address successively read by either of said reading means while active to supply data to said utilizing means for causing said manual means to supply the addressed data thereof to said utilizing means while halting temporarily the operation of said active reading means.

40. A data translation system comprising data utilizing means, first and second means each adapted to read an individual record medium and supply the recorded data thereof to said utilizing means, address-storage means, means responsive to preselected control data read from a preselected one of said record media for causing one of said reading means to search and locate in the record medium individual thereto data having an address supplied by the other of said reading means and stored in said address-storage means, and means for terminating the supply of data by said one reading means to said utilizing means during each said search operation of said one reading means.

References Cited in the file of this patent

UNITED STATES PATENTS

| | | |
|---|---|---|
| 1,606,126 | Houston | Nov. 9, 1926 |
| 2,199,541 | Harrison et al. | May 7, 1940 |
| 2,605,879 | O'Halloran | Aug. 5, 1942 |
| 2,448,842 | Tholstrup | Sept. 7, 1948 |

UNITED STATES PATENT OFFICE
CERTIFICATE OF CORRECTION

Patent No. 3,025,941　　　　　　　　　　　　　　　March 20, 1962

Edwin O. Blodgett et al.

It is hereby certified that error appears in the above numbered patent requiring correction and that the said Letters Patent should read as corrected below.

Column 1, lines 58 and 59, and column 2, lines 8 and 9, for "addresses", each occurrence, read -- addressees --; column 2, line 56, for "particularly" read -- particular --; column 3, line 61, for "electircal" read -- electrical --; column 4, line 49, for "peformed" read -- performed --; column 5, line 15, for "beqns" read -- begins --; column 6, line 57, for "tap" read -- tape --; column 15, line 40, for "mtor" read -- motor --; line 47, for "and" read -- such --; column 17, line 7, for "read" read -- reader --; column 20, line 48, for "Tl" read -- Pl --; column 21, line 1, for "closes" read -- close --; column 23, line 26, for "the", first occurrence, read -- that --; column 31, line 48, for "addresses" read -- addressed --; line 53, for "theory" read -- thereof --; line 58, for "locatte" read -- locate --; column 32, line 32, for "addresser" read -- addressed --.

Signed and sealed this 24th day of July 1962.

(SEAL)
Attest:
ERNEST W. SWIDER　　　　　　　　　　　　　　　DAVID L. LADD
Attesting Officer　　　　　　　　　　　　　　　Commissioner of Patents